(12) United States Patent
Perez Lara et al.

(10) Patent No.: US 12,556,291 B2
(45) Date of Patent: Feb. 17, 2026

(54) CALIBRATING AMPLITUDE AND PHASE OF A TRANSCEIVER ARRAY IN A NETWORK TEST DEVICE

(71) Applicant: VIAVI Solutions Inc., Chandler, AZ (US)

(72) Inventors: Pablo Perez Lara, St Neots (GB); Pak Chan, Cambridge (GB); Martyn Peter Binge, Stevenage (GB); Ian Derek Cairns, Alresford (GB)

(73) Assignee: VIAVI Solutions Inc., Chandler, AZ (US)

( * ) Notice: Subject to any disclaimer, the term of this patent is extended or adjusted under 35 U.S.C. 154(b) by 14 days.

(21) Appl. No.: 18/757,983

(22) Filed: Jun. 28, 2024

(65) Prior Publication Data
US 2026/0005775 A1 Jan. 1, 2026

(51) Int. Cl.
*H04B 17/12* (2015.01)
*H04B 17/21* (2015.01)

(52) U.S. Cl.
CPC ........... *H04B 17/12* (2015.01); *H04B 17/221* (2023.05)

(58) Field of Classification Search
CPC ........ H04B 17/11; H04B 17/12; H04B 17/15; H04B 17/18; H04B 17/21; H04B 17/221; H04B 17/294; H04B 17/296; H01Q 3/267
See application file for complete search history.

(56) References Cited

U.S. PATENT DOCUMENTS

| | | | |
|---|---|---|---|
| 6,339,399 B1 * | 1/2002 | Andersson | H01Q 3/267 342/174 |
| 11,482,779 B2 * | 10/2022 | Bates | G01S 7/4021 |
| 2004/0042428 A1 | 3/2004 | Hamalainen et al. | |
| 2010/0117890 A1 * | 5/2010 | Vook | H04B 17/21 342/174 |
| 2016/0294488 A1 * | 10/2016 | Sun | H04B 17/14 |

OTHER PUBLICATIONS

Extended European Search Report for Application No. EP25183002.2, mailed on Nov. 11, 2025, 8 pages.
Groschel, P., et al., "A System Concept for Online Calibration of Massive MIMO Transceiver Arrays for Communication and Localization", IEEE Transactions on Microwave Theory and Techniques, vol. 65 (5), May 1, 2017, pp. 1735-1750, XP011648242, ISSN: 0018-9480, DOI: 10.1109/TMTT.2017.2663404.

* cited by examiner

*Primary Examiner* — Tung X Le
(74) *Attorney, Agent, or Firm* — Harrity & Harrity, LLP

(57) ABSTRACT

In some implementations, a network test device may apply a first calibration scheme to a transceiver array of the network test device using a first calibration signal, wherein the first calibration scheme is to measure a relative frequency response between transceivers of the transceiver array and remove errors associated with the relative frequency response, where the relative frequency response is associated with an amplitude and a phase. The network test device may apply a second calibration scheme to the transceiver array using a second calibration signal, wherein the second calibration scheme is to remove changes in the relative frequency response, where the changes in the relative frequency response are associated with changes in the amplitude and in the phase. The network test device may evaluate a wireless base station using the transceiver array that is calibrated based on the first calibration scheme and the second calibration scheme.

20 Claims, 31 Drawing Sheets

300 —▶

CALIBRATING AMPLITUDE AND PHASE OF A TRANSCEIVER ARRAY IN A NETWORK TEST DEVICE

BACKGROUND

A network test device may be used by network equipment manufacturers for function, system integration, capacity, and stress testing and emulation of a plurality of mobile devices, across multiple cells, to set up and test network nodes, such as Fourth Generation (4G) and Fifth Generation (5G) network nodes. A network test device may deliver voice, data, realistic mobility models, and 4G/5G core emulation, thereby providing a comprehensive validation solution. A network test device may ensure that users in a network are obtaining adequate quality of service. A network test device may ensure that the network is satisfying latency and round-trip-time requirements for voice- and time-critical applications.

SUMMARY

In some implementations, a method includes applying, by a network test device, a first calibration scheme to a transceiver array of the network test device using a first calibration signal, wherein the first calibration scheme is to measure a relative frequency response between transceivers of the transceiver array and remove errors associated with the relative frequency response, where the relative frequency response is associated with an amplitude and a phase; applying, by the network test device, a second calibration scheme to the transceiver array using a second calibration signal, wherein the second calibration scheme is to remove changes in the relative frequency response, where the changes in the relative frequency response are associated with changes in the amplitude and in the phase; and evaluating, by the network test device, a wireless base station using the transceiver array that is calibrated based on the first calibration scheme and the second calibration scheme.

In some implementations, a network test device includes one or more components configured to: apply a first calibration scheme to a transceiver array of the network test device using a first calibration signal, wherein the first calibration scheme is to measure a relative frequency response between transceivers of the transceiver array and remove errors associated with the relative frequency response, where the relative frequency response is associated with an amplitude and a phase; apply a second calibration scheme to the transceiver array using a second calibration signal, wherein the second calibration scheme is to remove changes in the relative frequency response, where the changes in the relative frequency response are associated with changes in the amplitude and in the phase; and evaluate a massive multiple-input multiple-output (MIMO) wireless base station using the transceiver array that is calibrated based on the first calibration scheme and the second calibration scheme.

In some implementations, a non-transitory computer-readable medium storing a set of instructions includes one or more instructions that, when executed by one or more processors of a network test device, cause the network test device to: apply a first calibration scheme to a transceiver array of the network test device using a first calibration signal, wherein the first calibration scheme is to measure a relative frequency response between transceivers of the transceiver array and remove errors associated with the relative frequency response, where the relative frequency response is associated with an amplitude and a phase; apply a second calibration scheme to the transceiver array using a second calibration signal, wherein the second calibration scheme is to remove changes in the relative frequency response, where the changes in the relative frequency response are associated with changes in the amplitude and in the phase; and evaluate a massive MIMO wireless base station using the transceiver array that is calibrated based on the first calibration scheme and the second calibration scheme.

DETAILED DESCRIPTION

Figure 1:
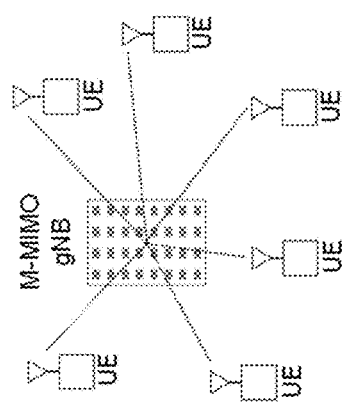
FIG. 1 is a diagram of an example associated with a massive MIMO base station.

The following detailed description of example implementations refers to the accompanying drawings. The same reference numbers in different drawings may identify the same or similar elements.

A network test device may be used by network equipment manufacturers for function, system integration, capacity, and stress testing and emulation of a plurality of mobile devices, across multiple cells, to set up and test network nodes, such as 4G and 5G network nodes. The network test device may deliver voice, data, realistic mobility models, and 4G/5G core emulation, thereby providing a comprehensive validation solution.

The network test device may include a transceiver array. The transceiver array may be used to produce a combination of signals in a simulation of a real-world scenario. The transceiver array may work in conjunction with a digital channel model using a channel matrix in order to produce the combination of signals. The usage of the transceiver array in conjunction with the digital channel may support dynamic scenarios, with channel characteristics and user equipment (UE) position changing over time. However, when producing the combination of signals, the transceiver array may not be calibrated in both amplitude and phase. An amplitude and phase accuracy may not be maintained over temperature and aging. The amplitude and phase accuracy may not absorb an effect of customer cables and attenuators. As a result, without an ability to achieve a required amplitude and phase accuracy, an overall system performance may be degraded.

In some implementations, the network test device may employ a transceiver array and associated calibration techniques to test massive MIMO base stations. The calibration techniques may be for correcting amplitude and phase errors in a massive MIMO RF frontend, and signal processing blocks may be employed to achieve the calibration. For a first stage calibration, the network test device may use a low-cost calibration box, which may use an RF power splitter and switches to measure a relative amplitude and phase response of all transceivers in the transceiver array, including customer cables and attenuators, which may provide a set of reference calibration data. For a second calibration stage, the transceivers of the transceiver array of the network test device may have internal couplers and switches connected to the RF power splitter internal to the network test device, which may enable continuous measurement of changes in the amplitude and phase response. The changes in the amplitude and phase response may be corrected digitally to compensate for effects of temperature, aging, and/or phase drift of local oscillators, during normal operation.

In some implementations, the transceiver array may be a scalable, modular calibrated transceiver array for applications, such as testing massive MIMO wireless base stations. The transceiver array may be calibrated using inexpensive passive hardware (e.g., no need for external equipment, such as a vector network analyzer or a high-speed oscilloscope). The transceiver array may be calibrated in two phases, which may correspond to an offline calibration and an online calibration.

In some aspects, the offline calibration may compensate for a relative frequency response between transceivers in the transceiver array. The offline calibration may be run at a factory or at a customer site. The offline calibration may compensate for an effect of cables, attenuators, etc., which means that expensive phase-matched or calibrated hardware may not be required. The offline calibration may use multi-tone signals to characterize frequency-dependent amplitude and phase errors. A low-cost external passive network that includes a Wye splitter and switches, previously calibrated with a vector network analyzer, may allow the transceiver array to calibrate itself. Receivers of the transceiver array may measure a common transmitter of the transceiver array, and transmitters of the transceiver array may be measured with a common receiver of the transceiver array. By using such measurements, the frequency-dependent amplitude and phase errors may be detected and then removed, thereby achieving the calibration for the transceiver array.

In some aspects, the online calibration, during a normal operation, may remove changes in a relative amplitude and phase response introduced by drift, temperature fluctuations, and/or aging. The online calibration may use low-level out-of-band calibration signals, which may not affect normal operation. The transceivers of the transceiver array may incorporate couplers and switches, which may allow for the calibration signals to be routed to other transceivers of the array through an internal Wye splitter. In this way, the receivers of the transceiver array may measure a common transmitter of the transceiver array, and the transmitters of the transceiver array may be measured with a common receiver of the transceiver array. By using such measurements, changes in the relative amplitude and phase response may be detected and removed, thereby achieving the calibration for the transceiver array.

In some implementations, by employing the transceiver array that corrects for the amplitude and phase errors, a required amplitude and phase accuracy may be achieved. The required amplitude and phase accuracy may be maintained over temperature and aging. The required amplitude and phase accuracy may absorb the effect of customer cables and attenuators, without requiring phase matched or calibrated devices. By correcting the amplitude and phase errors, a favorable performance may be achieved during testing, where the favorable performance may be defined in terms of a block error rate (BLER) and/or an error vector magnitude (EVM). The favorable performance during testing may characterize a calibration quality of a base station (e.g., how well calibrated the base station is) and evaluate an accuracy of the base station at selecting beamforming weights.

In some implementations, such an approach may be advantageous over a transceiver array calibrated in a factory, which would require calibrated or phase matched cables and attenuators. Further, such an approach may be advantageous over an approach where the network test system relies on pilot signals used by the base station in a downlink to compensate for amplitude and phase errors in downlink to optimize downlink performance in terms of EVM and BLER, while allowing the base station to use uplink pilots to demodulate the uplink signal and choose beamforming weights to be applied in the downlink. In such an approach, an ability to determine a quality of base station calibration and/or a performance of the base station in selecting beamforming weights may not be possible.

FIG. 1 is a diagram of an example 100 associated with a massive MIMO base station.

As shown in FIG. 1, in the field, a massive MIMO base station may use beamforming techniques to communicate with multiple UEs on a same physical resource (time and frequency), while minimizing interference between UEs. The base station may control a relative amplitude and a phase of signals reaching its antennas to form beams that point to the UEs distributed around the base station.

As indicated above, FIG. 1 is provided as an example. Other examples may differ from what is described with regard to FIG. 1.

Figure 2:
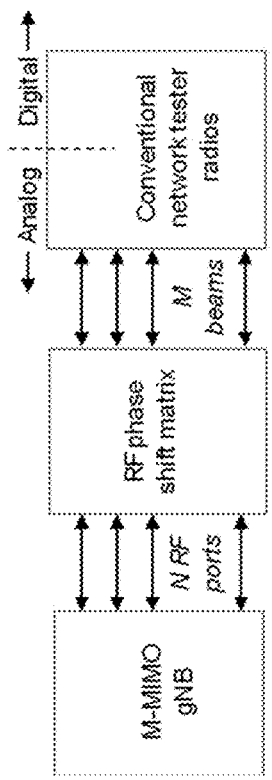
FIG. 2 is a diagram of an example associated with an analog channel model using a radio frequency (RF) phase shift matrix.

FIG. 2 is a diagram of an example 200 associated with an analog channel model using an RF phase shift matrix.

As shown in FIG. 2, in the laboratory, a real-world scenario may be simulated using a phase shift matrix (PSM), which is an analog device that creates linear combinations of RF signals using variable attenuators and phase shifters together with power splitter/combiners. In this way, the PSM may produce beams that are processed by conventional wireless network tester radios. In this case, a wireless network tester may be unaware that the wireless network tester is being used in a massive MIMO scenario. However, a PSM may be heavy, expensive, and/or lossy. A PSM may offer limited bandwidth and may only be used in static scenarios. Moreover, a PSM may offer limited resolution of configurable amplitude and phase relationships between beams and RF ports.

As indicated above, FIG. 2 is provided as an example. Other examples may differ from what is described with regard to FIG. 2.

Figure 3:
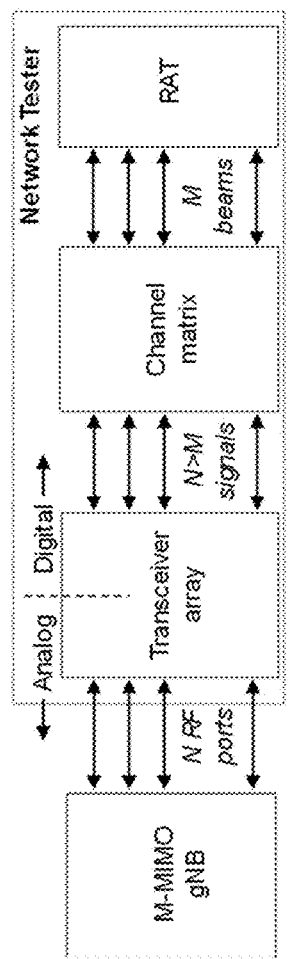
FIG. 3 is a diagram of an example associated with a digital channel model using a calibrated transceiver array.

FIG. 3 is a diagram of an example 300 associated with a digital channel model using a calibrated transceiver array.

As shown in FIG. 3, to overcome limitations of an analog approach, a digital channel model using a channel matrix may be applied to produce required linear combinations of signals. Such an approach may support dynamic scenarios, with channel characteristics and a UE position changing over time, or even a dispersive channel with characteristics varying with frequency. In order to achieve this, a wireless network tester may require a transceiver array calibrated in both amplitude and phase.

As indicated above, FIG. 3 is provided as an example. Other examples may differ from what is described with regard to FIG. 3.

In some implementations, in a calibrated transceiver array solution, a system may be based on a Multi-Transceiver Module (MTM) which comprises multiple RF transceivers, and a digital signal processing and computing block. Multiple MTMs may be connected to one FPGA card.

In some implementations, the MTMs may share clock and synchronization signals in a daisy chain topology, which may result in an asymmetric configuration which offers worse jitter and skew performance than a star topology. In the star topology, a common clock and synchronization signal are distributed to all the MTMS.

In some implementations, a transceiver array calibration process may be key to achieving a required amplitude and phase accuracy. The transceiver array calibration process may involve an offline calibration. A transceiver array may be connected to offline calibration equipment and several measurements may be carried out to remove relative frequency response errors. The offline calibration may compensate for an effect of customer cables and attenuators. The transceiver array calibration process may involve an online calibration. The online calibration may run continuously during normal operation to remove changes in relative amplitude and phase response caused by drift, temperature, and/or aging. The online calibration may use an online calibration board connected to calibration (CAL) ports of the MTMs.

In some implementations, a 64-transceiver×16 layers×100 MHz system may be built using a total of eight MTMs, each comprising eight RF transceivers, connected to a digital signal processing and computing block. The digital signal processing and computing block may carry out signal processing required by the MTMs, the calibration functions and radio access technology (RAT) signal processing functions. An online calibration network may include a Wye RF splitter required for the online calibration. A clock and synchronization block may produce the clock and synchronization signals needed by the MTMs (further shown in FIG. 28).

In some implementations, a 32 transceivers×8 layers×200 MHz system may be built, in which case only four eight-transceiver MTMs may be connected to the digital signal processing and computing block.

Figure 4:
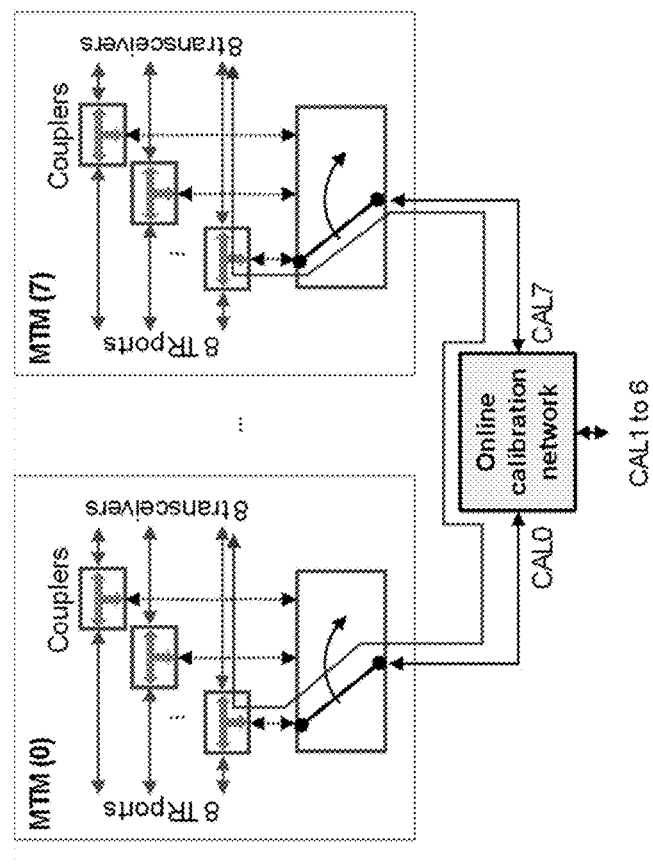
FIG. 4 is a diagram of an example associated with an online calibration setup.

FIG. 4 is a diagram of an example 400 associated with an online calibration setup.

As shown in FIG. 4, an online calibration setup may be used for a 64-port system. A similar solution may be applied to a 32-port system, but with four eight-transceiver MTMs instead of eight connected to the online calibration network. No dedicated calibration radio may be used, in order to reduce cost, footprint, and/or power consumption. Each eight-transceiver MTM may include eight transceivers. For each transceiver, a coupler may enable analyzing an output of a transmitter or inject signals into a receiver. The coupler may be implemented as a resistive tap-off to satisfy broad bandwidth requirements with a compact footprint. A switch may enable connecting one of the eight couplers to a CAL port of the eight-transceiver MTM. In this way, an RF path may be created between transceivers in multiple eight-transceiver MTMs using an online calibration network, which may be a passive device that does not offer isolation between ports, such as a Wye RF splitter.

In some implementations, an online calibration technique may rely on transmitting and measuring calibration tones outside a bandwidth occupied by a wanted signal to avoid undesired interference. No dedicated calibration radio may be present in the online calibration setup. Rather, an array of transceivers may characterize itself using a special technique to measure relative frequency responses.

As indicated above, FIG. 4 is provided as an example. Other examples may differ from what is described with regard to FIG. 4.

Figure 5:
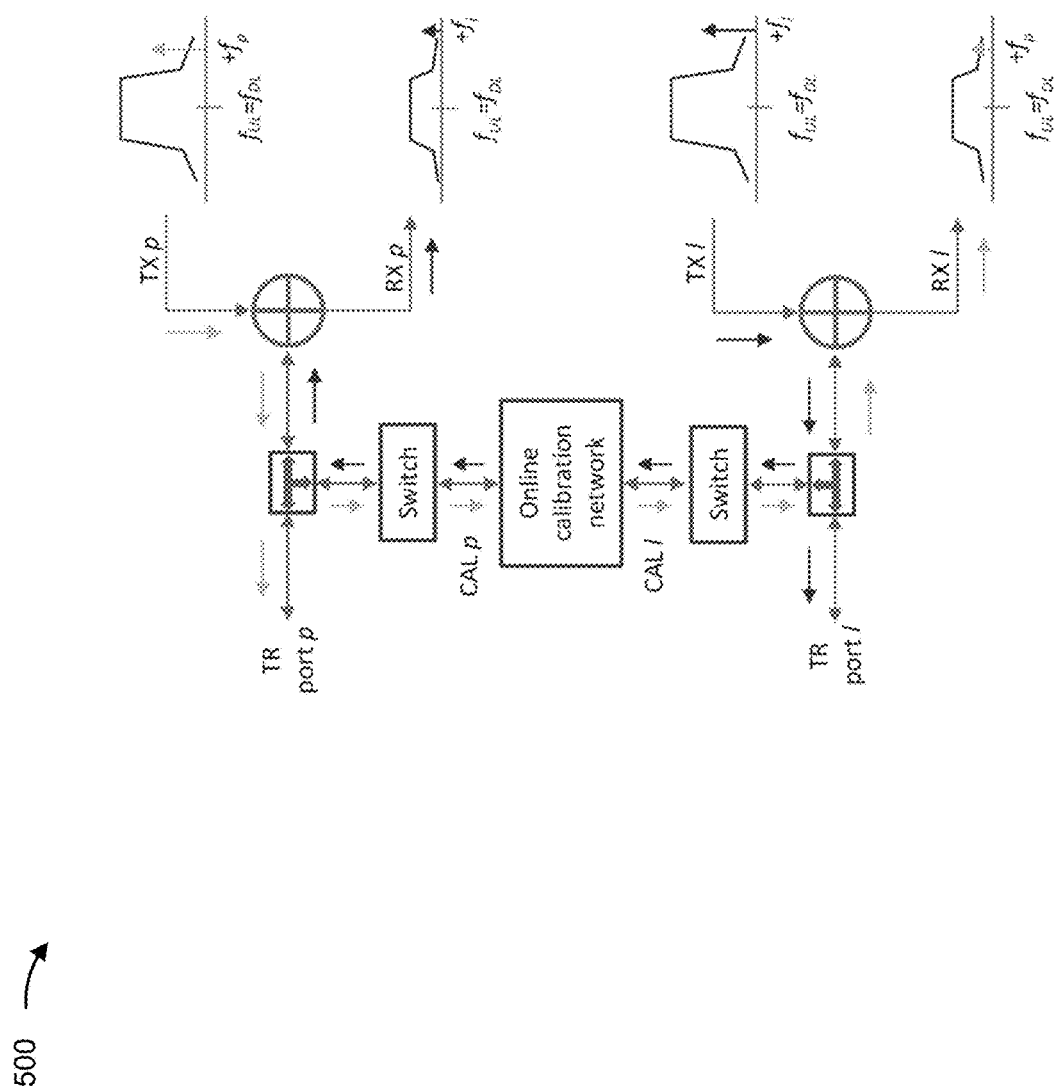
FIG. 5 is a diagram of an example associated with an online calibration process operation in a time division duplexing (TDD) system.

FIG. 5 is a diagram of an example 500 associated with an online calibration process operation in a TDD system.

As shown in FIG. 5, for TDD schemes, the online calibration process operation may use transceiver p and l from two separate eight-transceiver MTMs whose CAL ports are connected to an online calibration network. The transmitter p may output a wanted uplink signal at $f_{UL}$ together with a calibration tone at an offset $+f_p$. Through a combiner in an MTM frontend, a resulting signal may reach a transmitter-receiver (TR) port p and a coupler. From the coupler, the signal may travel through two switches, the online calibration network, and the combiner of transceiver 1 until the signal reaches receiver 1, operating at $f_{DL}$-$f_{UL}$, where a phasor of calibration tone +$f_p$ may be measured to estimate a relative frequency response between multiple transmitters or receivers. A portion of an output of a transmitter p may also arrive at a receiver p due to a limited isolation of the combiner of the transceiver p. However, since isolation is more sensitive to temperature, mismatch, etc. than transmission, the receiver p may not use the calibration tone +$f_p$. Similarly, the transmitter/may output a calibration tone at an offset +$f_l$, which is measured by the receiver p. A majority of massive MIMO scenarios may use TDD because a channel reciprocity when an uplink and a downlink use the same frequency allows for a channel to be more easily estimated.

As indicated above, FIG. 5 is provided as an example. Other examples may differ from what is described with regard to FIG. 5.

Figure 6:
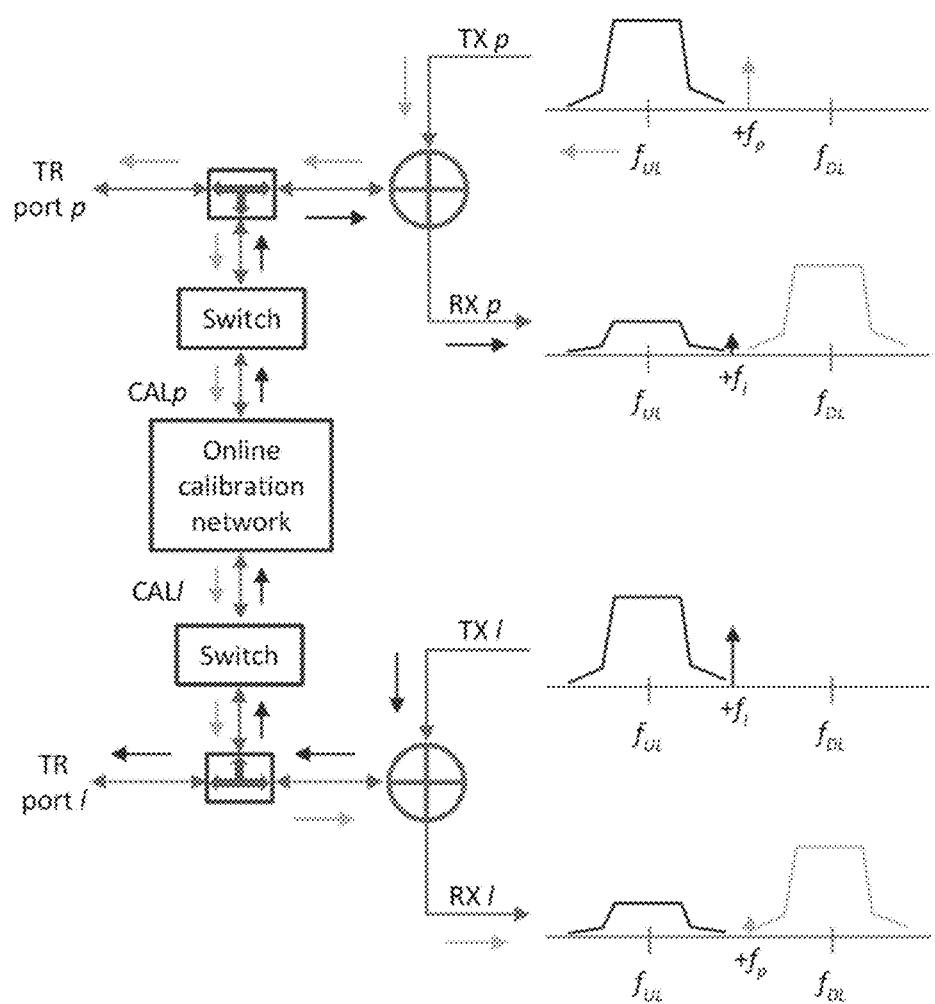
FIG. 6 is a diagram of an example associated with an online calibration process operation in a frequency division duplexing (FDD) system.

FIG. 6 is a diagram of an example 600 associated with an online calibration process operation in an FDD system.

As shown in FIG. 6, for FDD schemes, a calibration tone frequency may need to fall within a transceiver modulation bandwidth BW (which is not the same as a channel bandwidth), which may be in accordance with $|f_{UL}-f_{DL}| \leq BW/2$ so that the calibration tone produced by the transmitter can be measured by the receiver. When a system has a maximum data rate of 250 megasamples per second (MSPS) and RF data converters in an MTM have an 80% useful bandwidth, a maximum duplex spacing may be BW/2=100 MHZ.

As indicated above, FIG. 6 is provided as an example. Other examples may differ from what is described with regard to FIG. 6.

Figure 7:
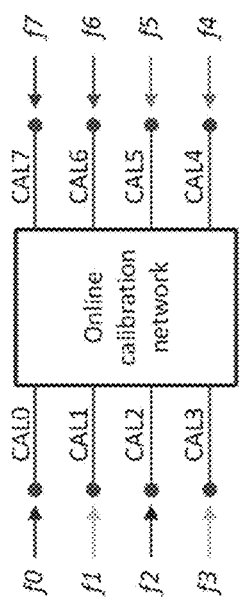
FIG. 7 is a diagram of an example associated with an online relative response measurement algorithm.

FIG. 7 is a diagram of an example 700 associated with an online relative response measurement algorithm.

In some implementations, a difference may exist between calibrating transmitters versus receivers. The receivers may measure an output of a common transmitter. The output of the transmitters, for accuracy and speed, should be measured by a common receiver, which means that the transmitters cannot use the same calibration tone frequency. When the transmitter is connected to CALn port (MTM n), the transmitter may only inject signals to receivers connected to other CAL ports (e.g., in other MTMs).

As shown in FIG. 7, a unique tone frequency may be assigned to each MTM. In other words, each MTM may inject a different calibration tone frequency into an online calibration network. In this example, $f_0$ may be coming from CAL0, $f_1$ from CAL1, and $f_n$ from CALn. Ignoring reflected signals (which would give unreliable results as reflection coefficients may change significantly with temperature), the transceivers connected to each CAL port may only measure calibration tones coming from the other CAL ports (e.g., a transceiver cannot measure itself). As a result, a two-stage online calibration technique may be defined.

In some implementations, a first stage may involve online calibration measurements per group. Eight groups n=0 . . . 7 may be formed by taking transceiver n of each eight-transceiver MTM. The groups may be calibrated separately. For n=0 . . . 7, MTM m (m=0 . . . 7) may connect transceiver n+8m to CALm. Receiver n+8m may measure simultaneously outputs of transmitters n+8k, k=0 . . . 7, k≠m, which may belong to MTM k and use calibration tone frequency $f_k$. The eight calibration tones $f_k$ may start at the same time. Output phasors of the eight receivers n+8m $A_{n+8m}$ may be measured. $A_{n+8m}(f_0)$, m=1 . . . 7 may be a result of measuring a signal coming from an n-th transmitter of MTM 0 (through CAL0) with an n-th receiver of MTM 1 . . . 7 (through CAL1 . . . 7) and allows to calibrate its relative response. $A_{n+8m}(f_1)$, m=0 and 2 may be needed to also calibrate the n-th receiver in MTM 0 by comparing a receiver with another receiver from a previous step (arbitrarily, an n-th receiver of MTM 2). Both receivers may measure an output of the n-th transmitter of MTM 1. $A_n(f_m)$, m=1 . . . 7 may be a result of measuring signals coming from the n-th transmitter of MTM 1 . . . 7 (through CAL1 . . . 7) with the n-th receiver of MTM 0 (through CAL0). In this way, a relative response of the n-th transmitter in MTM 1 . . . 7 may be calibrated. $A_{n+8}(f_0)$, $A_{n+8}(f_2)$ may measure signals coming from the n-th transmitter of MTM 0 and 2 using the n-th receiver of MTM 1, and may allow the n-th transmitter in MTM 0 to be calibrated by comparing a transmitter with another transmitter from a previous step (arbitrarily, the n-th transmitter of MTM 2).

In some implementations, the following ratios may be calculated, which may compare against MTM 2 (this is an arbitrary choice):

$$r_{mn} = \begin{cases} A_{n+8n}(f_0)/A_{n+16}(f_0) & m = 1 \ldots 7 \\ A_n(f_1)/A_{n+16}(f_1) & m = 0 \end{cases} \quad \text{Eq. 1}$$

$$t_{mn} = \begin{cases} A_n(f_m)/A_n(f_2) & m = 1 \ldots 7 \\ A_{n+8}(f_0)/A_{n+8}(f_2) & m = 0 \end{cases} \quad \text{Eq. 2}$$

where $r_{mn}$ applies to the receivers and $t_{mn}$ to the transmitters, respectively. Further, from Eq. 1 and Eq. 2, $r_{2n}=1$ and $t_{2n}=1$ because MTM 2 may be used arbitrarily as a reference.

In some implementations, a second stage may involve a comparison between groups. Eight groups are brought together by comparing one transceiver from each group. For example, group n may be represented by transceiver n of MTM n. MTM n (n=0 . . . 7) may connect transceiver 9n (e.g., the n-th transceiver of a corresponding MTM) to CALn. Receiver 9n may measure simultaneously outputs of transmitters 9k, k=0 . . . 7, k/n, which are the k-th transmitter of MTM k and use calibration tone frequency $f_k$. The eight calibration tones $f_k$ may start at the same time. Output phasors of the eight receivers 9n $B_{9n}$ may be captured simultaneously. $B_{9n}(f_0)$, n=1 . . . 7 may be a result of measuring an output of transmitter 0 of MTM 0 (through CAL0) with the n-th receiver of MTM n (n=1 . . . 7, through CALn). $B_0(f_1)$, $B_{18}(f_1)$ may be a measurement of the output of transmitter 1 of MTM 1 with receivers 0 and 2 of MTM 0 and 2, respectively, and may be needed to also calibrate receiver 0 of MTM 0 by comparing a receiver with another receiver from a previous step (arbitrarily, receiver 2 of MTM 2). $B_0(f_k)$, k=1 . . . 7 may be a result of measuring signals coming from transmitter k of MTM k (through CALk) with receiver 0 of MTM 0 (through CAL0). In this way, a relative response of the transmitters in MTM 1 . . . 7 may be calibrated. $B_0(f_0)$, $B_9(f_2)$ may allow to calibrate transmitter 0 of MTM 0 by comparing a transmitter with another transmitter from a previous group (arbitrarily, transmitter 2 of MTM 2).

In some implementations, the following ratios may be calculated, which may compare group n against group 2 (this is an arbitrary choice):

$$gr_n = \begin{cases} B_{9n}(f_0)/B_{18}(f_0) & n = 1\ldots 7 \\ B_0(f_1)/B_{18}(f_1) & n = 0 \end{cases} \quad \text{Eq. 3}$$

$$gt_n = \begin{cases} B_0(f_n)/B_0(f_2) & n = 1\ldots 7 \\ B_9(f_0)/B_9(f_2) & n = 0 \end{cases} \quad \text{Eq. 4}$$

where $gr_n$ applies to the receivers and $gt_n$ applies to the transmitters, respectively, with $gr_2 = gt_2 = 1$.

Using the two sets of ratios, the following may be defined for the receivers:

$$R_{mn} = \frac{r_{mn}}{r_{nn}} \cdot gr_n \quad \text{Eq. 5}$$

The following may be defined for the transmitters:

$$T_{mn} = \frac{t_{mn}}{t_{nn}} \cdot gt_n \quad \text{Eq. 6}$$

where the factors $1/r_{nn}(v_i)$ and $1/t_{nn}(v_i)$ may allow transceiver n of MTM n to represent itself. In the first stage, transceiver n of MTM m may be compared with transceiver n of MTM 2. Further, $R_{22} = T_{22} = 1$.

As indicated above, FIG. 7 is provided as an example. Other examples may differ from what is described with regard to FIG. 7.

In some implementations, an alternative online relative response measurement algorithm may be used to resolve difficulties that appear when a system is connected to an offline calibration box. In such a situation, online and offline calibration networks may offer different paths between transceivers of a same group, which may affect a result of both processes. In order to avoid this issue, an online calibration algorithm may be modified to measure a group of transceivers in two consecutive steps. In this way, the offline and online calibration algorithms may not attempt to measure the same transceivers simultaneously.

In some implementations, one approach may involve terminating RF ports of an offline calibration network while an online calibration is running. However, this approach may prevent an online calibration from running continuously during execution of an offline calibration.

In some implementations, the alternative online relative response measurement algorithm may define a two-stage online calibration technique. A first stage may involve online calibration measurements per group. Eight groups n=0 . . . 7 may be formed taking transceiver n of each MTM (e.g., MTM). The groups may be calibrated separately. For n=0 . . . 7, eight calibration tones $f_m$ (m=0 . . . 7) may start at the same time (one frequency assigned to each MTM). MTM m (m=1 . . . 7) may connect transceiver n+8m to CALm. MTM 0 may connect transceiver p, where p=n+1 for n=0 . . . 6, and p=n−1 for n=7. Receivers n+8m (m=1 . . . 7) may measure an output of a transmitter p, which may use a calibration tone frequency $f_0$. A receiver p may measure simultaneously outputs of transmitters n+8m (m=1 . . . 7), which may use calibration tone frequency $f_m$.

In some implementations, various phasors may be measured simultaneously. $A_{n+8m}(f_0)$, m=1 . . . 7 may be a result of measuring a signal coming from the transmitter p in MTM 0 (through CAL0) with an n-th receiver of MTM 1 . . . 7 (through CAL1 . . . 7) and may enable calibration of a relative response of these receivers. $A_p(f_m)$, m=1 . . . 7 may be a result of measuring signals coming from an n-th transmitter of MTM 1 . . . 7 (through CAL1 . . . 7) with a p-th receiver of MTM 0 (through CAL0). In this way, a relative response of the n-th transmitter in MTM 1 . . . 7 may be calibrated. MTM m (m=0, 2) may connect transceiver n+8m to CALm. MTM 1 may connect transceiver p+8, where p=n+1 for n=0 . . . 6, and p=n−1 for n=7. Receivers n+8m (m=0, 2) may measure an output of transmitter p+8, which may use calibration tone frequency $f_1$. Receiver p+8 may measure simultaneously outputs of transmitters n+8m (m=0, 2), which may use calibration tone frequency $f_m$.

In some implementations, various phasors may be measured simultaneously. $A_{n+8m}(f_1)$, m=0 and 2 may be needed to also calibrate the n-th receiver in MTM 0 by comparing a receiver with another receiver from a previous step (arbitrarily, the n-th receiver of MTM 2). Both receivers may measure an output of the p-th transmitter of MTM 1. $A_{p+8}(f_0)$, $A_{p+8}(f_2)$ may measure signals coming from the n-th transmitter of MTM 0 and MTM 2 using the p-th receiver of MTM 1, and may allow to calibrate the n-th transmitter in MTM 0 by comparing a transmitter with another transmitter from a previous step (arbitrarily, the n-th transmitter of MTM 2).

In some implementations, the following ratios may be calculated, which compare against MTM 2 (this is an arbitrary choice), in accordance with:

$$r_{mn} = \begin{cases} A_{n+8n}(f_0)/A_{n+16}(f_0) & m = 1\ldots 7 \\ A_n(f_1)/A_{n+16}(f_1) & m = 0 \end{cases} \quad \text{Eq. 7}$$

$$t_{mn} = \begin{cases} A_p(f_m)/A_p(f_2) & m = 1\ldots 7 \\ A_{p+8}(f_0)/A_{p+8}(f_2) & m = 0 \end{cases} \quad \text{Eq. 8}$$

where $r_{mn}$ applies to the receivers and $t_{mn}$ applies to the transmitters, respectively. From Eq. 7 and Eq. 8, $r_{2n}$ and $t_{2n} = 1$ because MTM 2 may be used arbitrarily as a reference.

In some implementations, a second stage may involve a comparison between groups. Eight groups may be brought together by comparing one transceiver from each group. For example, group n may be represented by transceiver n of MTM n. Eight calibration tones $f_n$ (n=0 . . . 7) may start at the same time (one frequency assigned to each MTM). MTM n (n=1 . . . 7) may connect transceiver 9n (e.g., an n-th transceiver of the corresponding MTM) to CALn. MTM 0 may connect transceiver 1. Receivers 9n (n=1 . . . 7) may measure simultaneously an output of transmitter 1 in MTM 0, which may use calibration tone frequency $f_0$. Receiver 1 in MTM 0 may measure an output of transmitters 9n, n=1 . . . 7, which may be an n-th transmitter of MTM n and uses calibration tone frequency $f_n$.

In some implementations, the following phasors may be measured simultaneously. $B_{9n}(f_0)$, n=1 . . . 7 may be a result of measuring an output of transmitter 1 of MTM 0 (through CAL0) with an n-th receiver of MTM n (n=1 . . . 7, through CALn), and may allow to calibrate a relative response of these receivers. $B_1(f_n)$, n=1 . . . 7 may be a result of measuring signals coming from transmitter n of MTM n (through CALn) with receiver 1 of MTM 0 (through CAL0). In this way, a relative response of the transmitters in MTM 1 . . . 7 may be calibrated. MTM n (n=0, 2) may connect transceiver 9*n* (e.g., an n-th transceiver of a corresponding MTM) to CALn. MTM 1 may connect its transceiver 0 (corresponding to transceiver 8 at a system level). Receivers 9*n* (n=0, 2) may measure an output of transmitter 8, which may use calibration tone frequency $f_1$. Receiver 8 may measure simultaneously outputs of transmitters 9*n* (n=0, 2), which may use calibration tone frequency $f_n$.

In some implementations, receivers 9*n* (n=1 . . . 7) may measure simultaneously an output of transmitter 1 in MTM 0, which may use calibration tone frequency $f_0$. Receiver 1 in MTM 0 may measure an output of transmitters 9*n*, n=1 . . . 7, which may be an n-th transmitter of MTM n and may use calibration tone frequency $f_n$.

In some implementations, the following phasors may be measured simultaneously. $B_0(f_1)$, $B_{18}(f_1)$ may be a measurement of an output of transmitter 0 of MTM 1 with receivers 0 and 2 of MTM 0 and MTM 2, respectively, and may be needed to also calibrate receiver 0 of MTM 0 by comparing the receiver with another receiver from a previous step (arbitrarily, receiver 2 of MTM 2). $B_8(f_0)$, $B_8(f_2)$ may allow to calibrate transmitter 0 of MTM 0 by comparing the transmitter with another transmitter from a previous group (arbitrarily, transmitter 2 of MTM 2).

In some implementations, the following ratios may be calculated, which may compare group n against group 2 (this is an arbitrary choice), in accordance with:

$$gr_n = \begin{cases} B_{9n}(f_0)/B_{18}(f_0) & n = 1\ldots 7 \\ B_0(f_1)/B_{18}(f_1) & n = 0 \end{cases} \quad \text{Eq. 9}$$

$$gt_n = \begin{cases} B_1(f_n)/B_1(f_2) & n = 1\ldots 7 \\ B_8(f_0)/B_8(f_2) & n = 0 \end{cases} \quad \text{Eq. 10}$$

where $gr_n$ applies to the receivers and $gt_n$ to the transmitters, respectively, with $gr_2=gt_2=1$. Using the two sets of ratios, the following may be defined for the receivers:

$$R_{mn} = \frac{r_{mn}}{r_{nn}} \cdot gr_n \quad \text{Eq. 11}$$

The following may be defined for the transmitters:

$$T_{mn} = \frac{t_{mn}}{t_{nn}} \cdot gt_n \quad \text{Eq. 12}$$

where the factors $1/r_{mn}(v_i)$ and $1/t_{nn}(v_i)$ may allow transceiver n of MTM n to represent itself. In the first stage, transceiver n of MTM m may be compared with transceiver n of MTM 2). Further, $R_{22}=T_{22}=1$.

In some implementations, an online calibration process may require taking reference values of $T_{mn}$ and $R_{mn}$ (e.g., $T_{mn,ref}$ and $R_{mn,ref}$) during an onsite or factory calibration, using the online relative response measurement algorithm. These reference values may be stored for usage by the online calibration process. During a normal operation, the system may periodically obtain new values of $T_{mn}$ and $R_{mn}$ (e.g., $T_{mn}[i]$ and $R_{mn}[i]$), which may be compared to $T_{mn,ref}$ and $R_{mn,ref}$ to calculate gain and phase corrections for a transmitter, $G_{TXmn}[i]$ and $\theta_{TXmn}[i]$, respectively, in accordance with:

$$G_{TXmn}[i] = \left| \frac{T_{mn,ref}}{T_{mn}[i]} \right| \quad \text{Eq. 13}$$

$$\theta_{TXmn}[i] = -\angle \frac{T_{mn}[i]}{T_{mn,ref}} \quad \text{Eq. 14}$$

and for the receiver, $G_{RXmn}[i]$ and $\theta_{RXmn}[i]$:

$$G_{RXmn}[i] = \left| \frac{R_{mn,ref}}{R_{mn}[i]} \right| \quad \text{Eq. 15}$$

$$\theta_{RXmn}[i] = -\angle \frac{R_{mn}[i]}{R_{mn,ref}} \quad \text{Eq. 16}$$

In some implementations, an orthogonality may exist between calibration tones and wanted signals. For orthogonal frequency division multiplexing (OFDM) modulation, which may be used in wireless standards like Wi-Fi, Fourth Generation (4G) Long Term Evolution (LTE), and Fifth Generation (5G) New Radio (NR), an orthogonality may exist between equally spaced subcarriers. To minimize an impact on uplink and downlink performance, unused subcarrier frequencies in a guard band of a channel may be chosen to transmit the calibration tones. A subcarrier spacing (SCS) may be 15 kilohertz (kHz), 30 kHz, or 60 kHz in frequency range 1 (FR1). An SCS may be 60 kHz, 120 kHz, 240 kHz, 480 kHz, or 960 kHz in frequency range 2 (FR2). A 60 kHz grid may be used for the calibration tones in FR1. In FR2, to avoid wasting bandwidth, and given that a 960 kHz SCS is optional, 480 kHz may be used. However, a grid may be programmable by an application to optimize performance for each scenario. Further, to minimize the impact on uplink and downlink performance, a transmission of calibration tones may be ramped up or ramped down, instead of abrupt switching. OFDM may expect an amplitude and a phase of subcarriers to be constant over a symbol period. When the calibration tones are turned on/off abruptly in the middle of a symbol, interference may be caused to other subcarriers, and making the online calibration blocks aware of symbol boundaries may be difficult.

Figure 8:
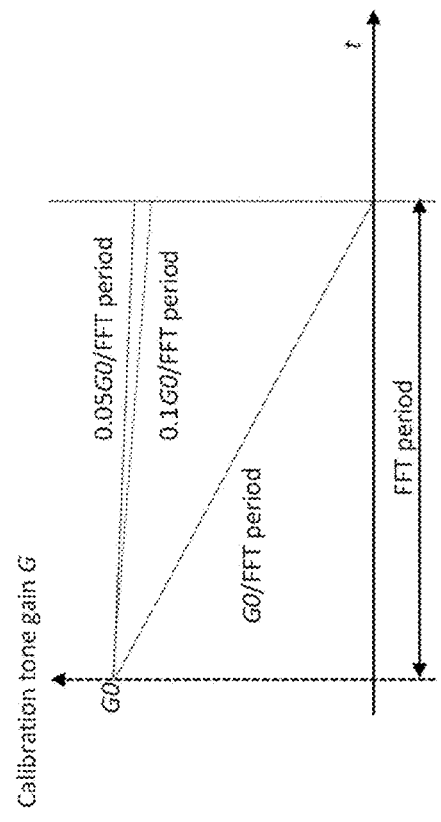
FIG. 8 is a diagram of an example associated with ramping a calibration tone gain over time instead of abrupt switching.

FIG. 8 is a diagram of an example 800 associated with ramping a calibration tone gain over time instead of abrupt switching.

As shown in FIG. 8, ramping may involve modifying a calibration tone gain G linearly over time. A variation slope may be defined to activate (G from 0 to $G_0$) or deactivate (G from $G_0$ to 0) a tone. A gentler slope may have an effect on a single calibration tone, which may involve a reduction of interference between the calibration tone and other subcarriers. For example, a slope of $0.05 \cdot G_0$ per fast Fourier transform (FFT) period may allow to place the calibration tone at least 30 subcarriers away from a wanted signal bandwidth for an attenuation of 70 dB. 20 FFT periods may be needed to fully turn on or off the calibration tone. For a smallest SCS of 15 kHz, a ramp duration of approximately 20/15 kHz=1.3 ms may be used to enable or disable the calibration tone. Halving the slope may reduce the interference by 6 dB but may double the ramp duration.

As indicated above, FIG. 8 is provided as an example. Other examples may differ from what is described with regard to FIG. 8.

Figure 9:
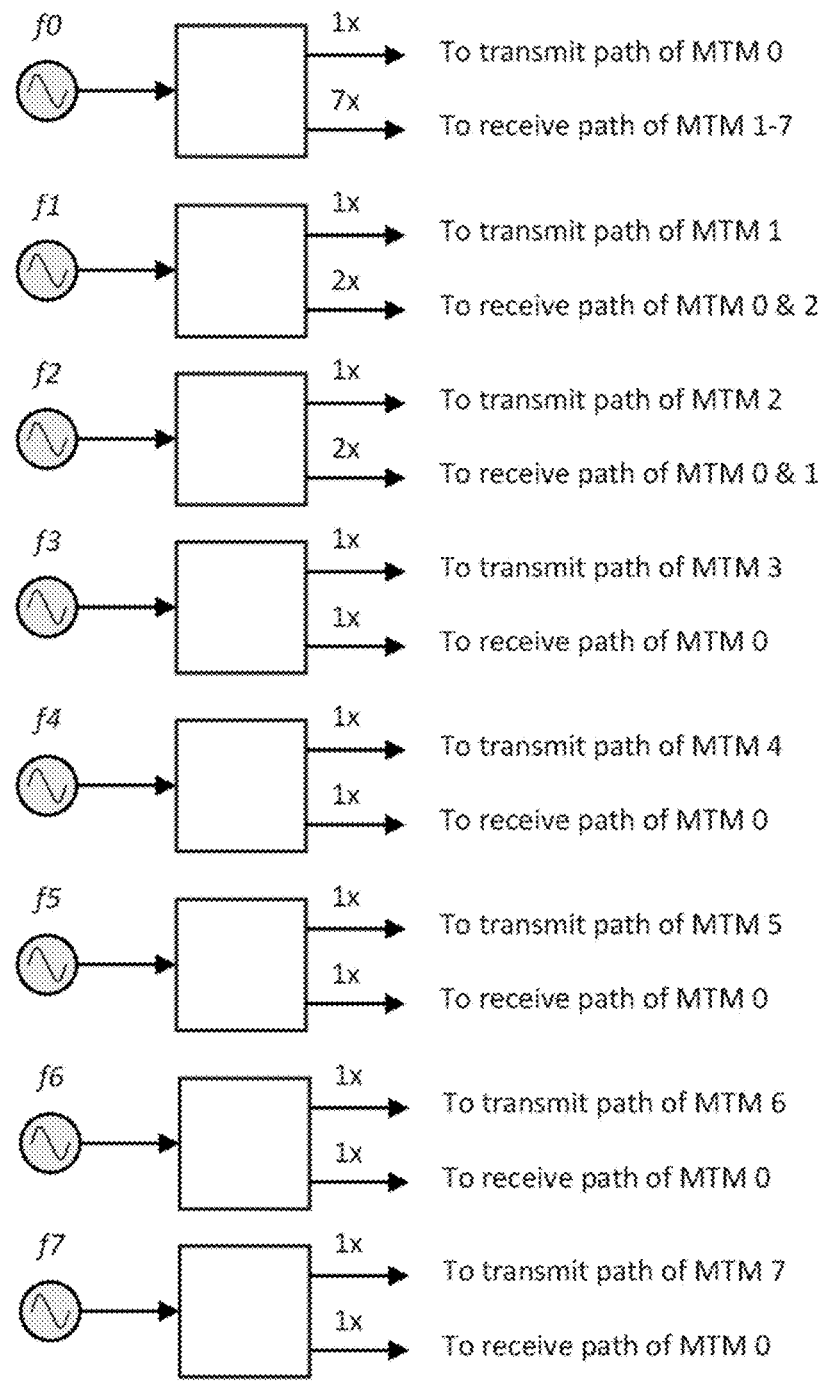
FIG. 9 is a diagram of an example associated with required numerically controlled oscillator (NCO) blocks.

FIG. 9 is a diagram of an example 900 associated with required NCO blocks.

A total of eight NCO frequencies $f_0 \ldots f_7$ may be needed (e.g., one per MTM). Each NCO may drive one transmit path and as many receive paths as required by an algorithm.

As indicated above, FIG. 9 is provided as an example. Other examples may differ from what is described with regard to FIG. 9.

Figure 10:
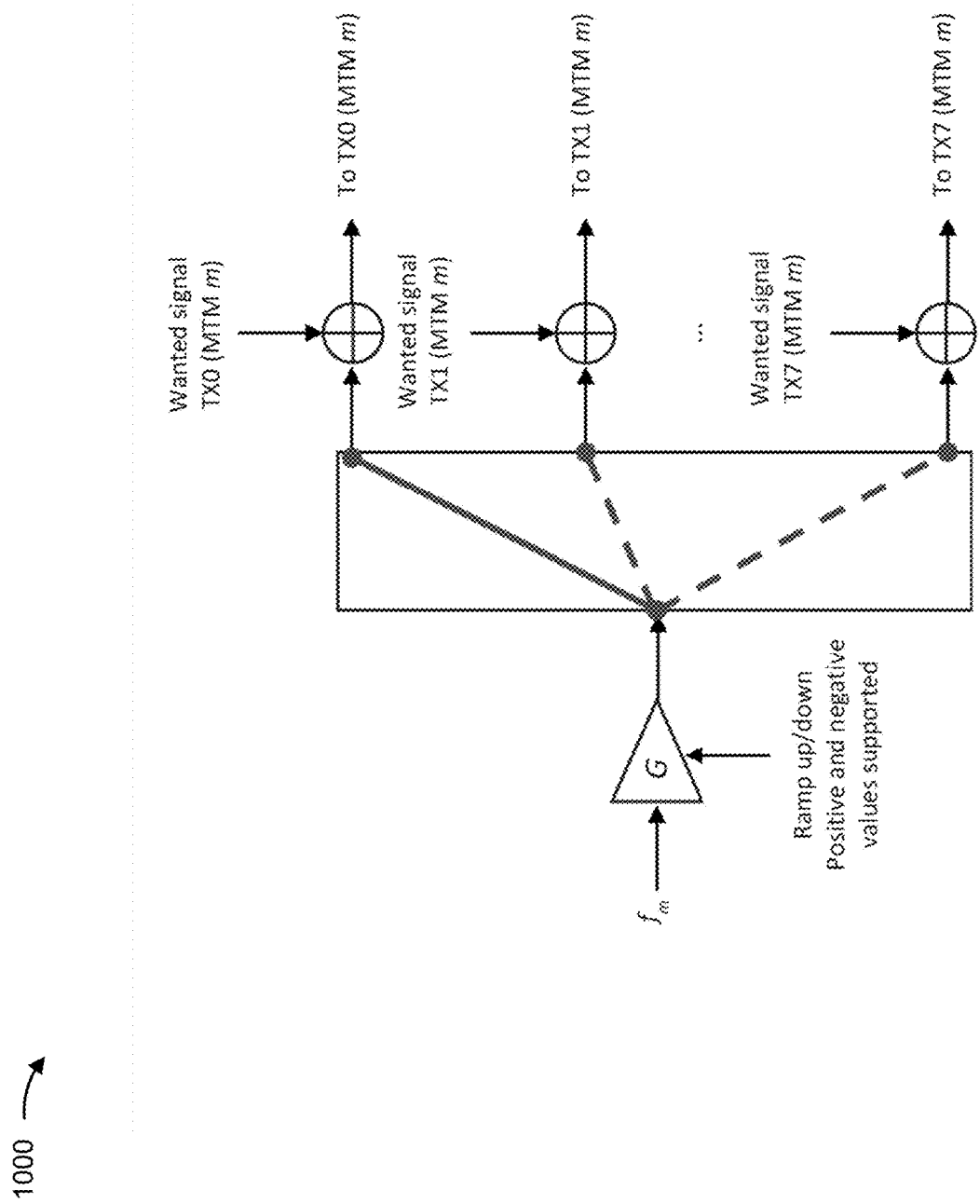
FIG. 10 is a diagram of an example associated with an insertion of a calibration tone in a transmit path.

FIG. 10 is a diagram of an example 1000 associated with an insertion of a calibration tone in a transmit path.

As shown in FIG. 10, for each MTM there may be a block to inject a calibration tone into one of the transmitter paths of the MTM. The tone may be produced by an NCO corresponding to a specific MTM. A gain block may allow to configure a tone level. Negative and positive gain G values may be applied to attenuate spurs. G may be set to 0 code/code to stop outputting the calibration tone when not required. G may be ramped up and down to minimize in-band interference on a transmitter output.

As indicated above, FIG. 10 is provided as an example. Other examples may differ from what is described with regard to FIG. 10.

Figure 11:
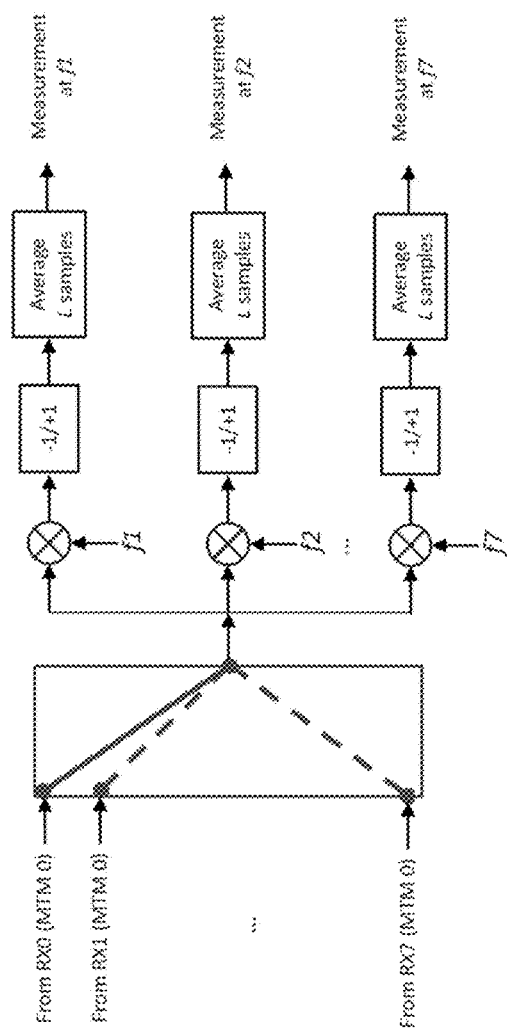
FIG. 11 is a diagram of an example associated with phasor measurements.

FIG. 11 is a diagram of an example 1100 associated with phasor measurements.

As shown in FIG. 11, a phasor measurement block for MTM 0 may be used (e.g., phasor measurements at $f_1 \ldots f_7$ for MTM 0). The block may measure phasors corresponding to $f_1 \ldots f_7$ simultaneously. One receiver of MTM 0 may be connected. To measure a phasor for $f_k$, a signal may be multiplied by an output of a corresponding NCO, and a result may be low-pass filtered by calculating an average of L samples. The average reduces the noise in the measurement, helping to improve accuracy.

In some implementations, a −1/+1 block may allow to invert an input to an average when negative G values are used. In this way, spurious signals may be attenuated by taking one measurement with a positive gain value $+G_0$ and +1, followed by a second measurement with $-G_0$ and −1, respectively. The two measurements may be added together to reduce a level of spurs close to a calibration tone frequency (ideally cancelling them), improving measurement accuracy. When transitioning from $G_0$ to $-G_0$, a ramp needs to be applied to avoid interference on an uplink wanted signal.

As indicated above, FIG. 11 is provided as an example. Other examples may differ from what is described with regard to FIG. 11.

Figure 12:
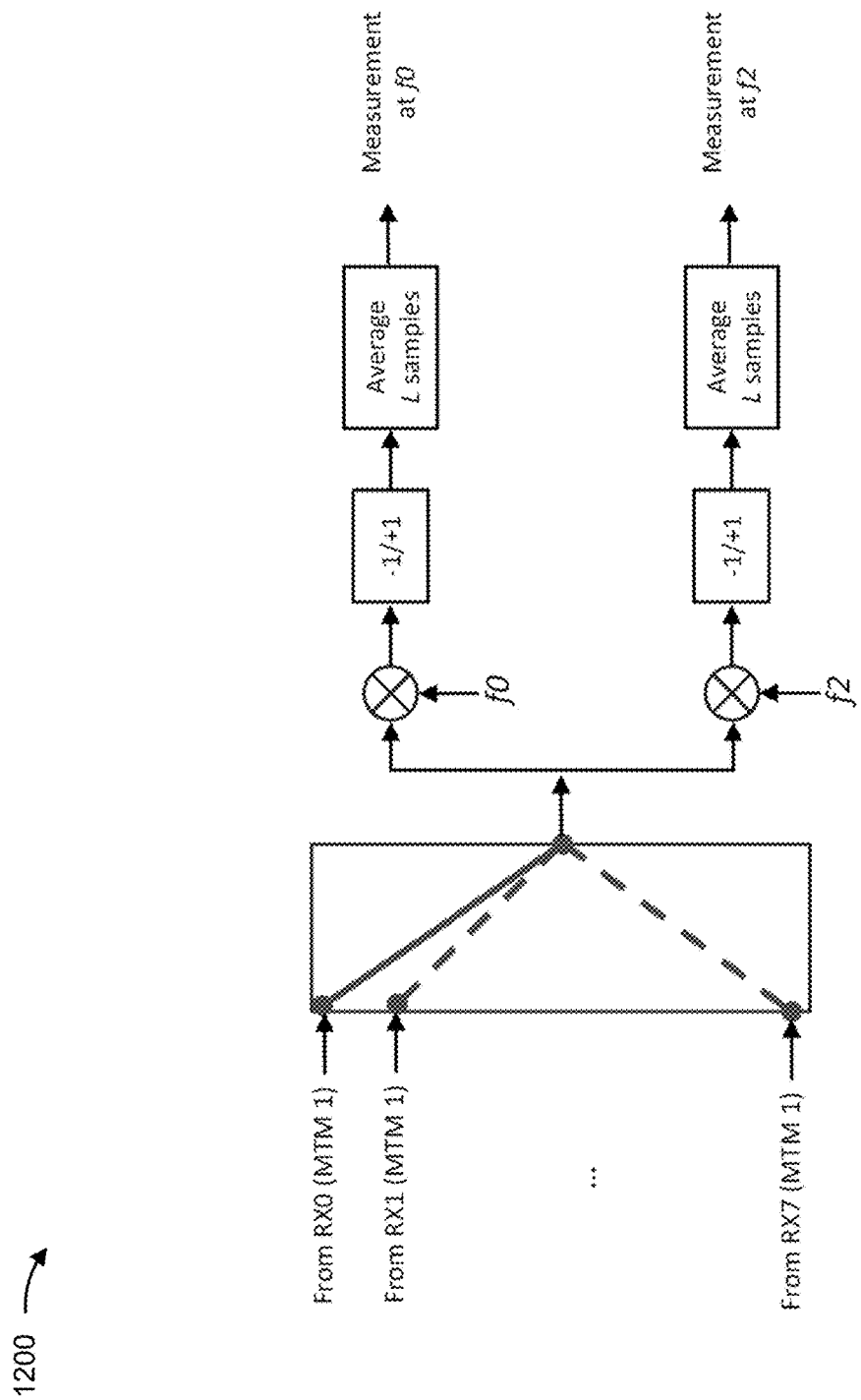
FIG. 12 is a diagram of an example associated with phasor measurements.

FIG. 12 is a diagram of an example 1200 associated with phasor measurements. As shown in FIG. 12, a phasor measurement block for MTM 1 may be used to obtain phasor measurements at $f_0$ and $f_2$. The phasor measurement block may be used for measuring only two frequencies. As indicated above, FIG. 12 is provided as an example. Other examples may differ from what is described with regard to FIG. 12.

Figure 13:
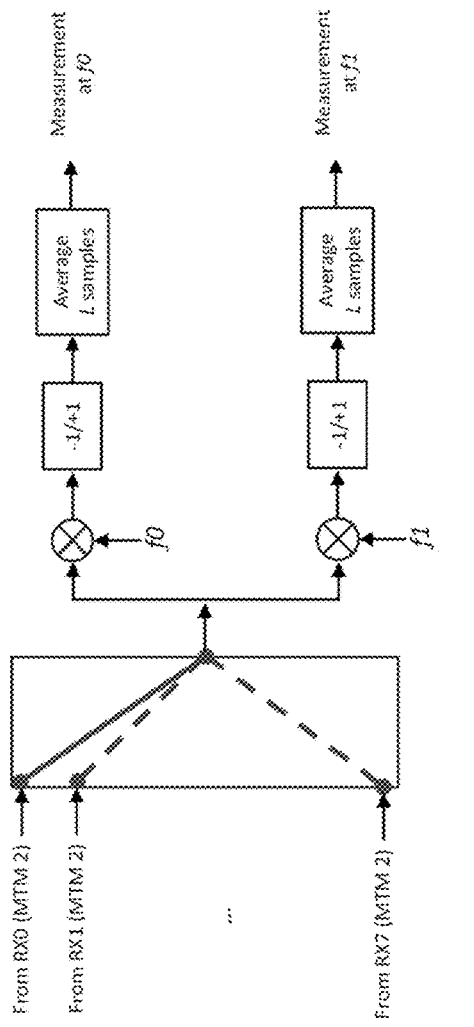
FIG. 13 is a diagram of an example associated with phasor measurements.

FIG. 13 is a diagram of an example 1300 associated with phasor measurements. As shown in FIG. 13, a phasor measurement block for MTM 2 may be used to obtain phasor measurements at $f_0$ and $f_1$. The phasor measurement block may be used for measuring only two frequencies. As indicated above, FIG. 13 is provided as an example. Other examples may differ from what is described with regard to FIG. 13.

Figure 14:
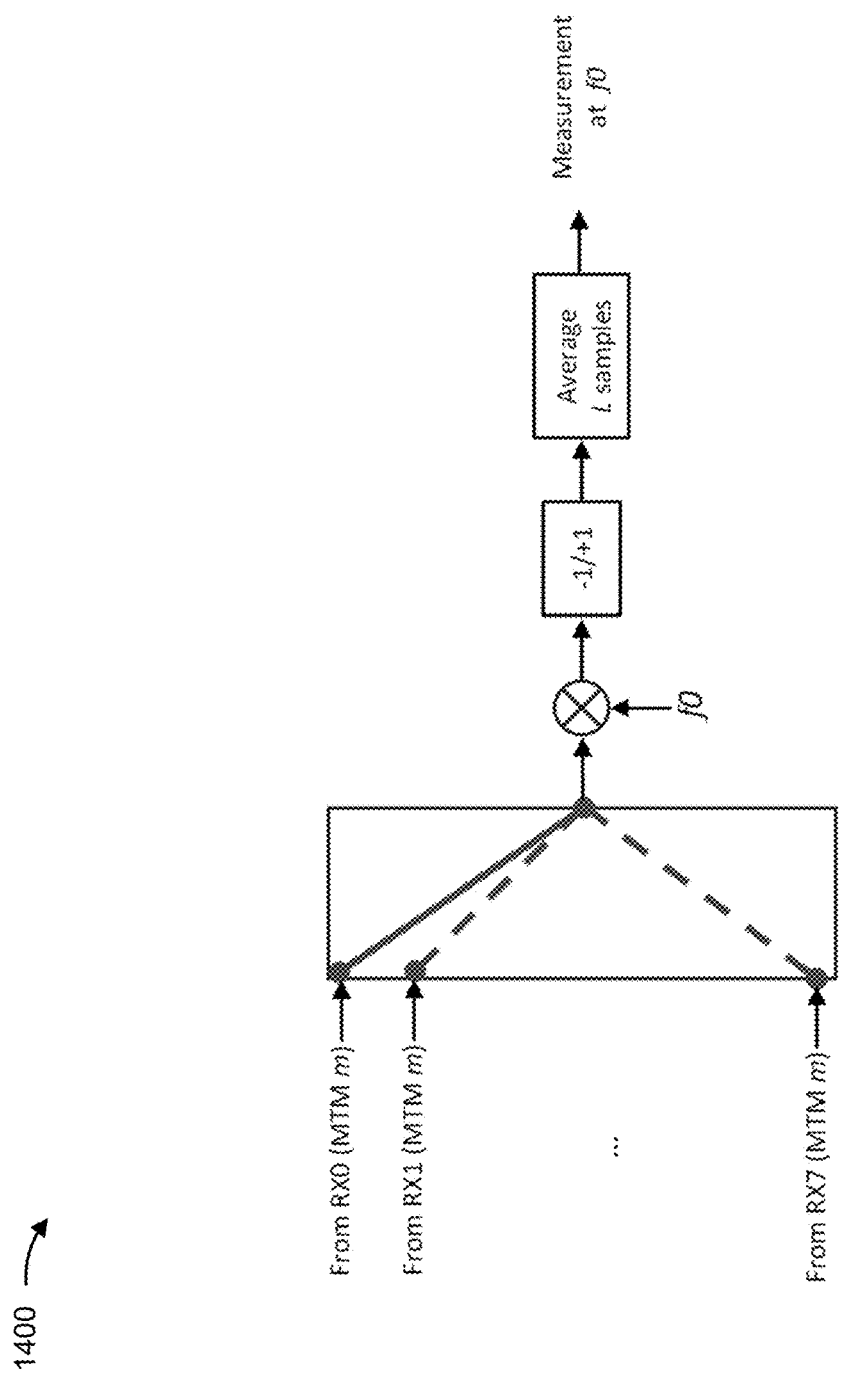
FIG. 14 is a diagram of an example associated with phasor measurements.

FIG. 14 is a diagram of an example 1400 associated with phasor measurements. As shown in FIG. 14, a phasor measurement block for MTM m=3 . . . 7 may be used to obtain phasor measurements at $f_0$. In other words, MTM 3 . . . 7 may measure only $f_0$. As indicated above, FIG. 14 is provided as an example. Other examples may differ from what is described with regard to FIG. 14.

Figure 15:
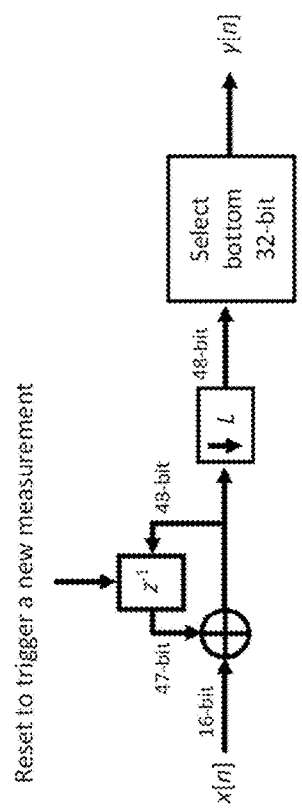
FIG. 15 is a diagram of an example associated with average samples with an accumulator.

FIG. 15 is a diagram of an example 1500 associated with averaging samples with an accumulator. As shown in FIG. 15, the accumulator may be used to efficiently calculate an average of L samples. A delay cell may be reset to trigger a new measurement. As indicated above, FIG. 15 is provided as an example. Other examples may differ from what is described with regard to FIG. 15.

In some implementations, as part of a configuration of a calibration tone level and gain ramp, an output of an NCO that produces a calibration tone may be between −1 and +1 (e.g., −3 dBFS) using a square-wave criterion to define full-scale. A gain $G_{req}$(dB) required to achieve a certain tone power $P_{req}$(dBFS) may be calculated as:

$$G_{req}\text{ (dB)}=P_{req}\text{ (dBFS)}-(-3)\text{ dBFS} \qquad \text{Eq. 17}$$

which may be written in code/code units as:

$$G_{req}(\text{code/code})=10^{G_{req}(dB)/20} \qquad \text{Eq. 18}$$

which excludes the sign. Setting $G_{req}$(code/code)>1 may not be acceptable, due to clipping.

Figure 16:
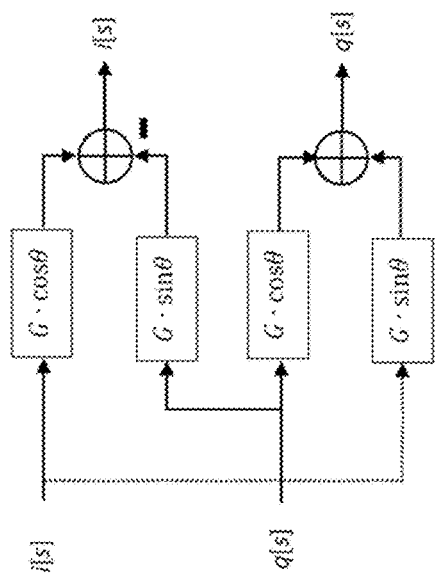
FIG. 16 is a diagram of an example associated with amplitude and phase correction.

FIG. 16 is a diagram of an example 1600 associated with amplitude and phase correction.

As shown in FIG. 16, signaling processing may be employed for amplitude and phase corrections. Given amplitude G and phase corrections θ estimated for a transmitter using Eq. 13 and Eq. 14, or a receiver using Eq. 15 and Eq. 16, an FPGA may implement the following equations:

$$i_{out}[s]=G\cdot\{i_{in}[s]\cdot\cos\theta-q_{in}[s]\cdot\sin\theta\} \qquad \text{Eq. 19}$$

$$q_{out}[s]=G\cdot\{i_{in}[s]\cdot\sin\theta+q_{in}[s]\cdot\cos\theta\}, \qquad \text{Eq. 20}$$

where $i_{in}$, $q_{in}$ and $i_{out}$, $q_{out}$ are in-phase and quadrature signals at an input and output of a correction block, respectively.

As indicated above, FIG. 16 is provided as an example. Other examples may differ from what is described with regard to FIG. 16.

Figure 17:
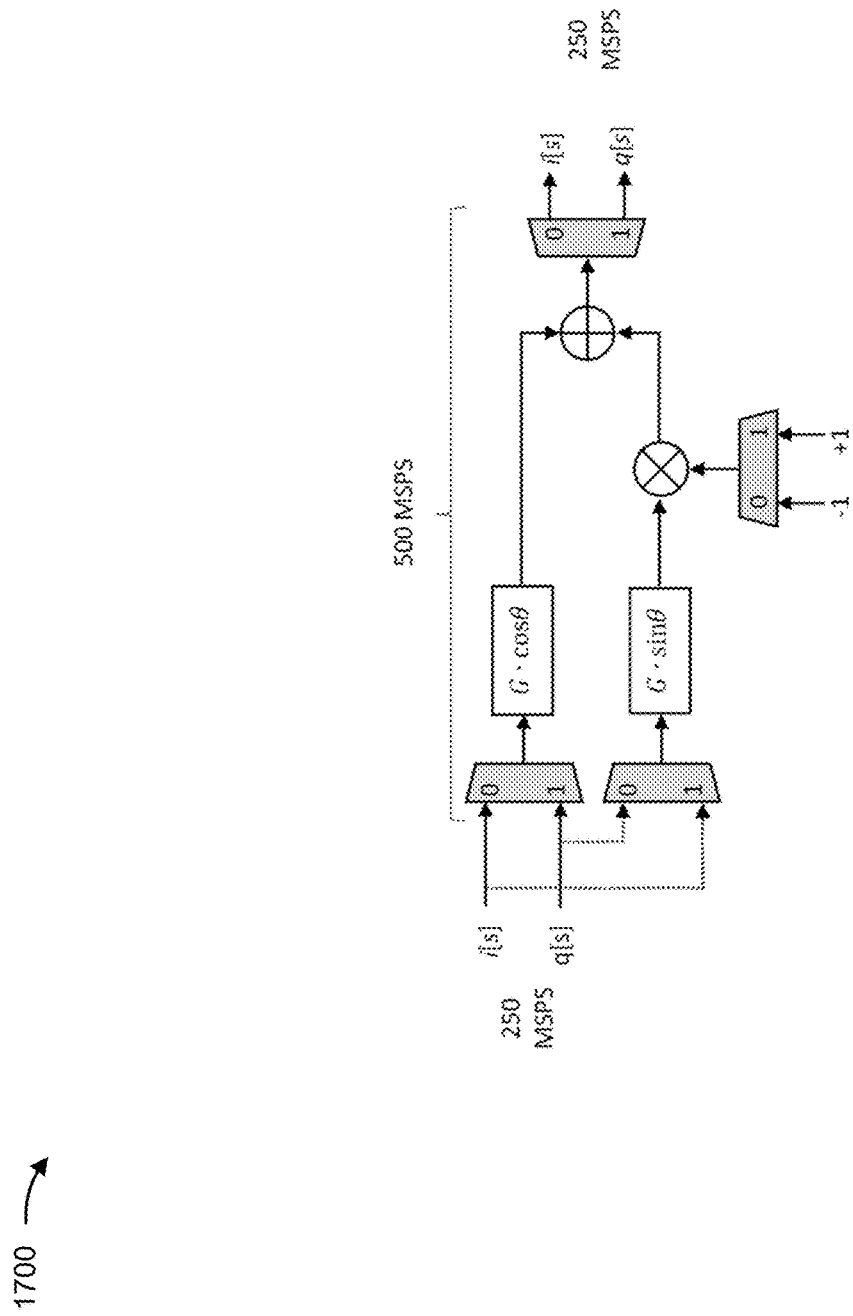
FIG. 17 is a diagram of an example associated with multiplexed amplitude and phase correction.

FIG. 17 is a diagram of an example 1700 associated with multiplexed amplitude and phase correction.

As shown in FIG. 17, a multiplexed amplitude and phase correction for a 200 MHz bandwidth (500 MSPS core) may be defined. A resource utilization may be reduced by overclocking and multiplexing signal processing blocks (e.g., for the 200 MHz bandwidth). The signal processing blocks may operate at 500 MSPS on multiplexed I and Q inputs. A multiplier may apply an inversion to one of the inputs of an adder, which may be needed to calculate $i_{out}[s]$.

As indicated above, FIG. 17 is provided as an example. Other examples may differ from what is described with regard to FIG. 17.

Figure 18:
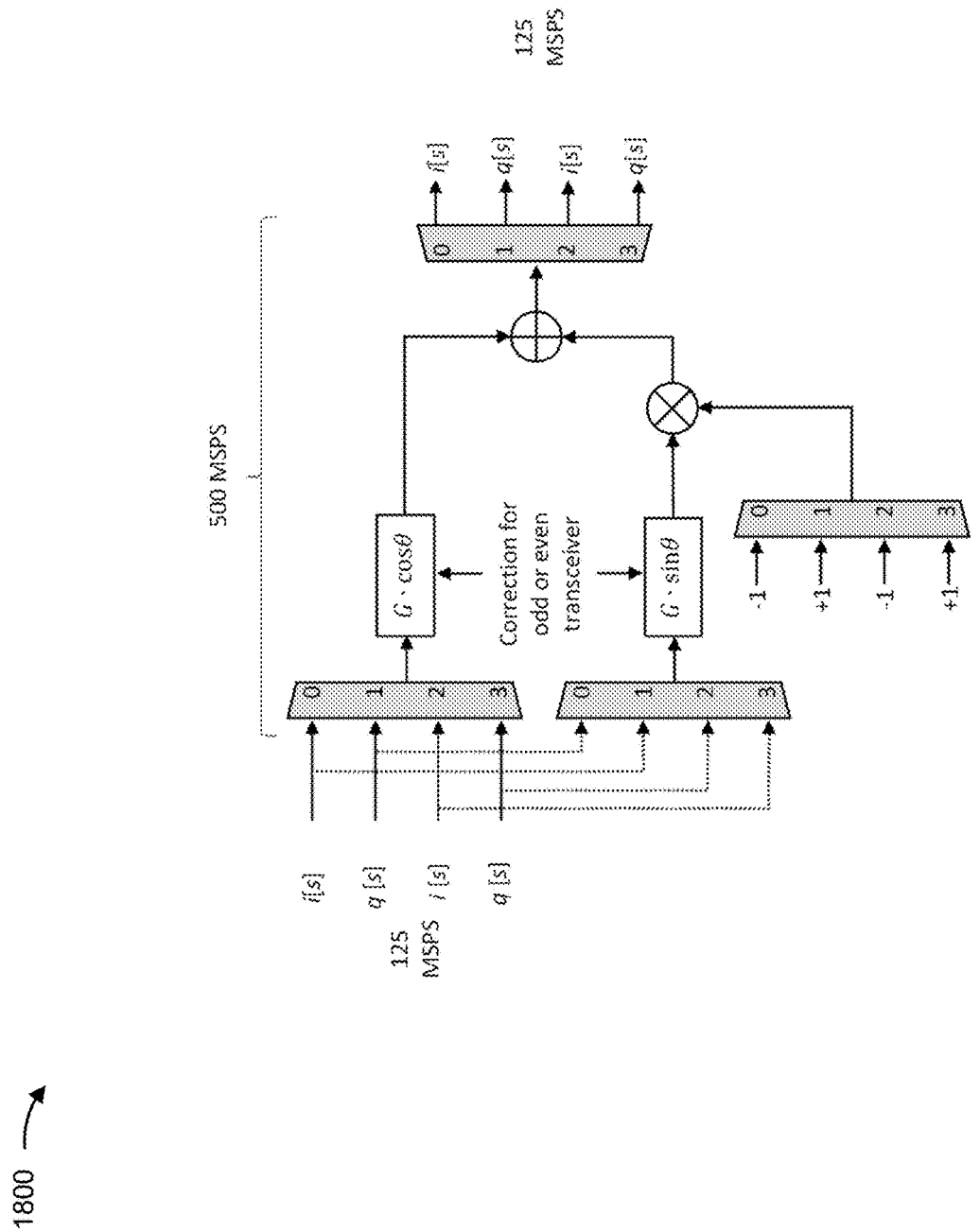
FIG. 18 is a diagram of an example associated with multiplexed amplitude and phase correction.

FIG. 18 is a diagram of an example 1800 associated with multiplexed amplitude and phase correction.

As shown in FIG. 18, a multiplexed amplitude and phase correction for a 100 MHz bandwidth (500 MSPS core) may be defined. A higher resource optimization may be achieved for the 100 MHz bandwidth. In this case, signal processing blocks may operate on multiplexed I and Q inputs corresponding to two different transceivers. Since each transceiver may require a different correction, G·cos θ and G·sin θ may need to be reprogrammed continuously every two clock cycles. In some cases, in order to reduce DSP resource utilization, the amplitude and phase correction may be absorbed into equalizers.

As indicated above, FIG. 18 is provided as an example. Other examples may differ from what is described with regard to FIG. 18.

Figure 19:
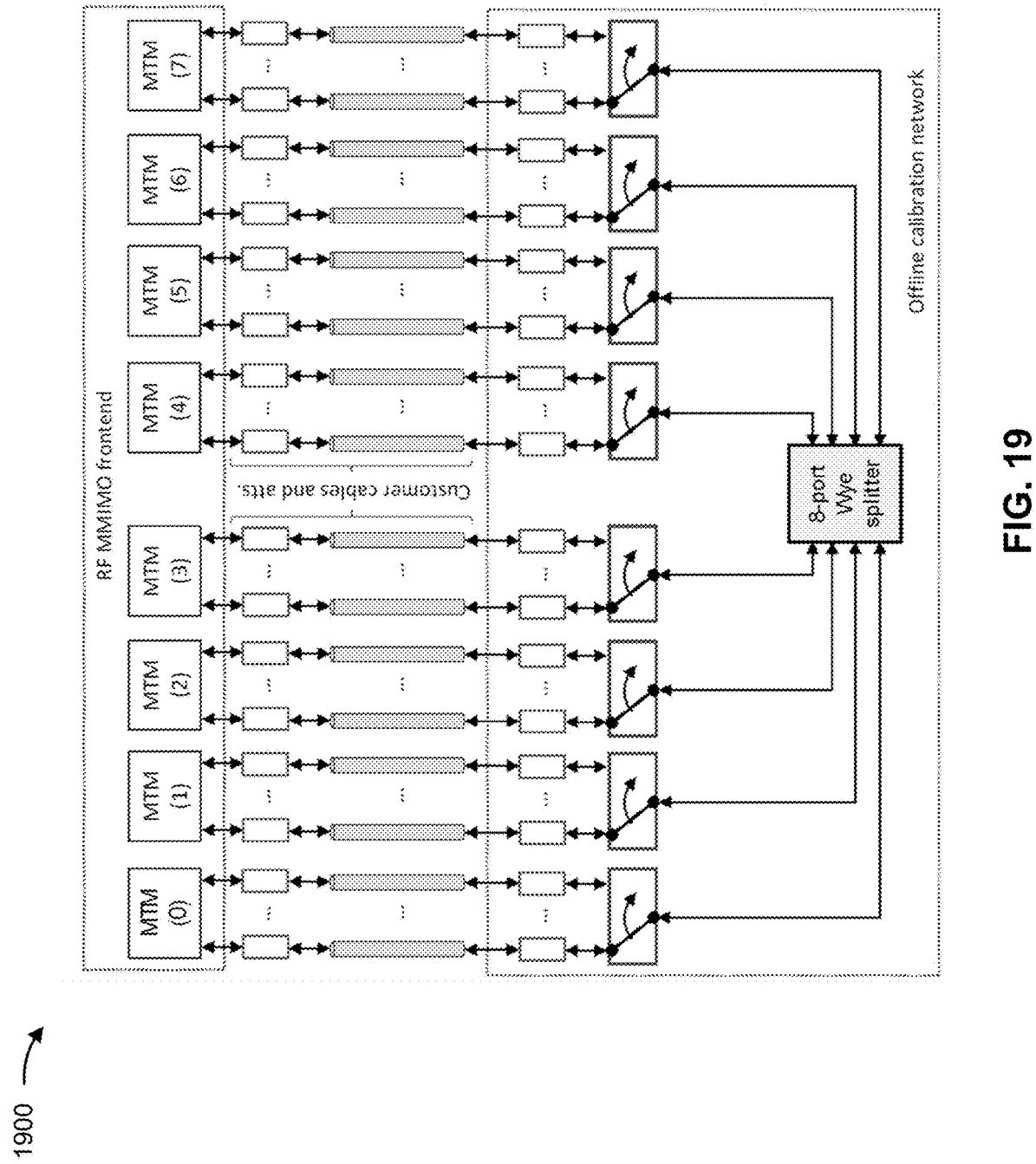
FIG. 19 is a diagram of an example associated with an offline calibration setup.

FIG. 19 is a diagram of an example 1900 associated with an offline calibration setup.

As shown in FIG. 19, an offline calibration setup may be used for a 64-port system (usage with a smaller number of RF ports may call for termination of unused ports of an offline calibration network with a 50 (load). An RF massive MIMO tester, through customer cables and attenuators used by a customer in an application, may be connected to an offline calibration network, which may allow to include an effect of the customer's hardware in a calibration. The offline calibration network may include eight SP8T switches, 64 attenuators (for impedance matching), and an 8-port Wye splitter. The offline calibration network may be designed to minimize insertion loss. In this way, required measurements may be performed quickly while incorporating a customer's attenuators. The offline calibration network may be designed for scalability. A larger number of ports may be supported without excessive insertion loss by combining different types of SPnT switches. The offline calibration network may be designed to integrate with online calibration techniques, since both offline calibration and online calibration may use a combination of switches and a Wye splitter to characterize the RF transceivers sequentially.

As indicated above, FIG. 19 is provided as an example. Other examples may differ from what is described with regard to FIG. 19.

In some implementations, an offline calibration technique may use an in-band multi-tone signal to measure a relative frequency response (in amplitude and phase) of an array of transceivers within a modulation bandwidth, including a customer's cables and attenuators. Such information may be used to populate equalizers that compensate for the relative frequency response. A relative frequency response measurement may involve using a common receiver to characterize the transmitters, and a common transmitter to compare the receivers.

Figure 20:
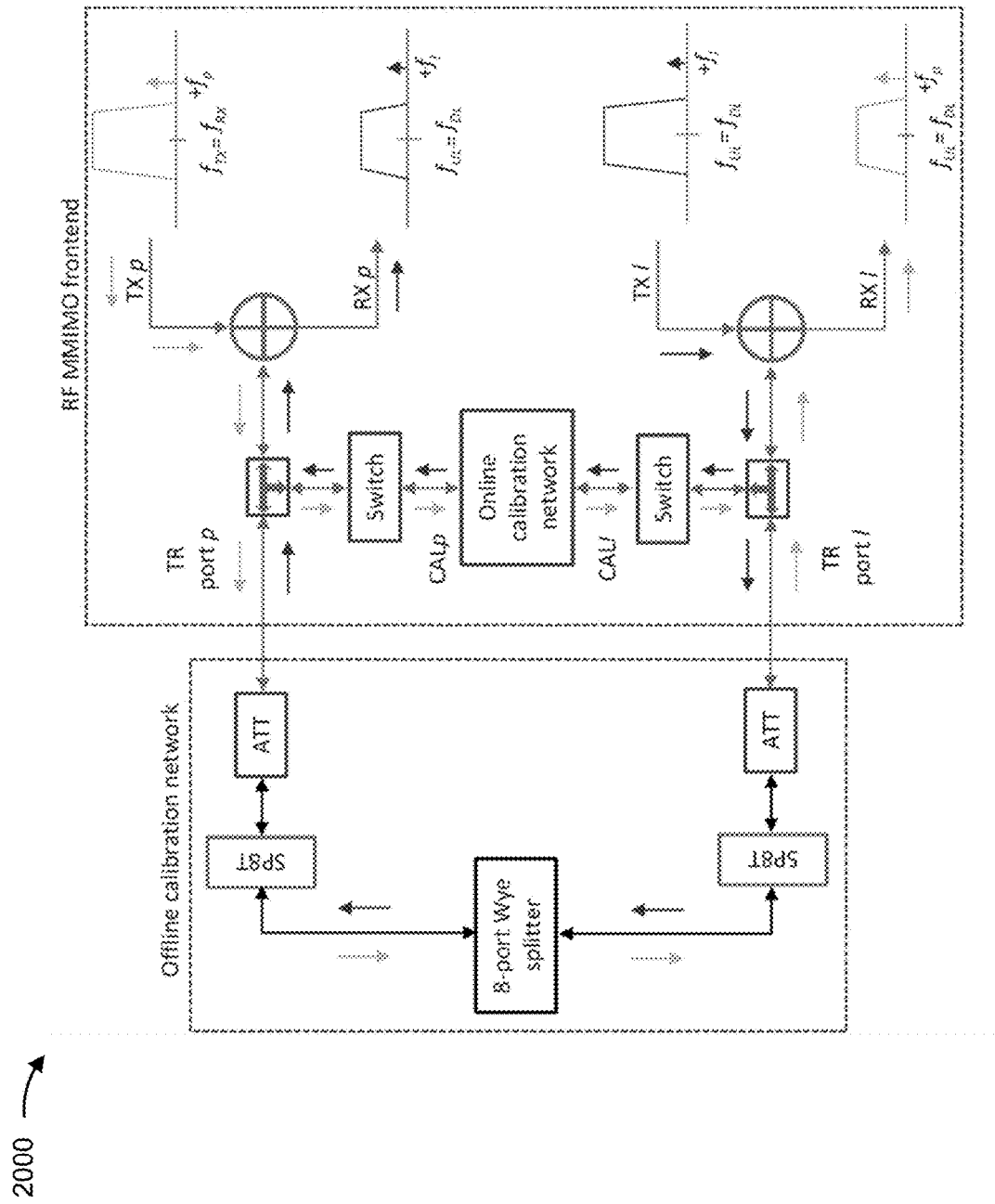
FIG. 20 is a diagram of an example associated with a signal flow through an offline calibration network.

FIG. 20 is a diagram of an example 2000 associated with a signal flow through an offline calibration network.

As shown in FIG. 20, calibration signals may flow through the offline calibration network. A path may also exist through an online calibration network. A multitone signal may be used for offline calibration, and a single tone may be required for online calibration. When both the offline and online calibration paths are active at the same time, incorrect measurements may be obtained for equalizers and reference values of an online calibration $T_{mn,ref}$ and $R_{mn,ref}$. Thus, for any transceiver, two separate measurements may be used. An equalizer response may use multi-tone signals, which may flow through the offline calibration network, with MTM couplers terminated into 50Ω instead of being connected to the online calibration network. Reference values for online calibration may use single-tone signals defined for the online calibration, which may pass through the online calibration network, with the offline calibration network SP8T switches providing 50Ω termination to all TR ports.

As indicated above, FIG. 20 is provided as an example. Other examples may differ from what is described with regard to FIG. 20.

In some implementations, multi-tone signals may be generated and measured using an FFT algorithm. For example, reusing an $N_{FFT}=8192$ samples playback and a capture mechanism may allow to produce and measure baseband frequencies $f_{BB}[i]$ given by:

$$f_{BB}[i] = i \cdot \frac{F_s}{N_{FFT}}, \quad \text{Eq. 21}$$

where $i=-N_{FFT}/2 \ldots N_{FFT}/2-1$. With $F_S=245.7$ MSPS and $N_{FFT}=8192$, a frequency grid of 30 kHz is given. Similar to an online calibration, multiple transceivers should be characterized simultaneously, which may minimize phase drift effects and reduce measurement time. Each transmitter connected to an 8-port Wye splitter through switches may use a different set of baseband frequencies for characterization of a frequency response.

Figure 21:
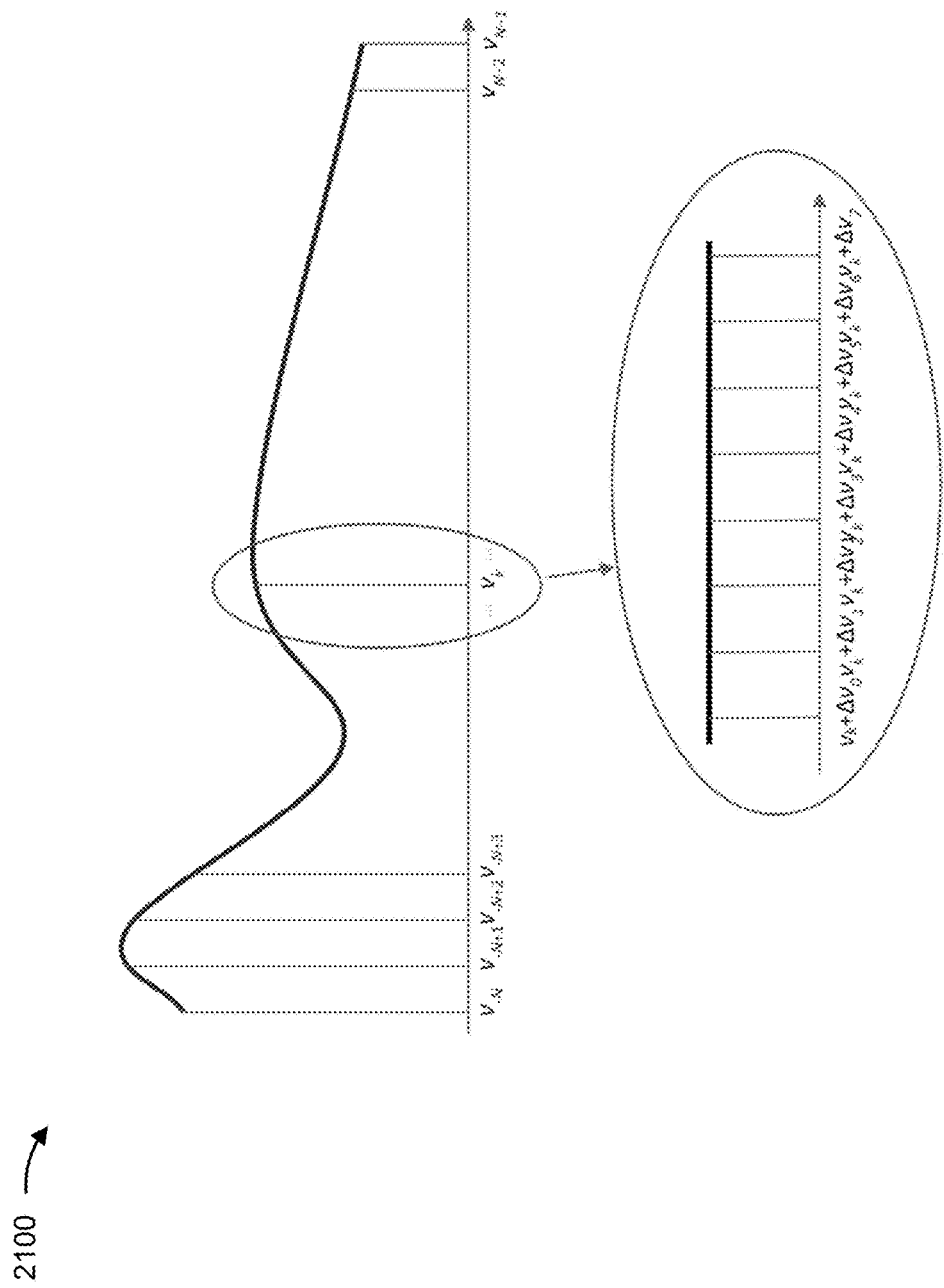
FIG. 21 is a diagram of an example associated with avoiding interference between transmitters during an offline calibration by using orthogonal sets of multi-tone frequencies.

FIG. 21 is a diagram of an example 2100 associated with avoiding interference between transmitters during an offline calibration by using orthogonal sets of multi-tone frequencies.

As shown in FIG. 21, $v_i$ ($i=-N \ldots N-1$) refers to nominal baseband measurement frequencies used to estimate a relative frequency response, with $v_i$ in a frequency grid defined by Eq. 21. A total of 2N measurement frequencies may be given. For an m-th MTM, a set of baseband frequencies $v_i+\Delta v_m$ may be allocated, where $\Delta v_m$ is a frequency offset in an FFT grid. A reasonable choice for $\Delta v_m$ may be:

$$\Delta v_m = (m-4) \cdot \frac{F_s}{N_{FFT}} \quad \text{Eq. 22}$$

When $F_S/N_{FFT}$ is small, then an effect of a $\Delta v_m$ frequency offset may be negligible and a response may be considered approximately constant around $v_k$, e.g., $F_S=245.7$ MSPS and $N_{FFT}=8192$ gives $|\Delta v_m| \le |\Delta v_0| = 120$ kHz which is very small in comparison with the modulation bandwidth of the MTM. A large delay difference of 2.3 ns may cause a very small phase error of 0.1° with a frequency offset of 120 kHz. A result of the FFT may depend on a time at which the $N_{FFT}$ time-domain samples are captured. For this reason, a digital reference channel may be required, which may include a reference multi-tone signal containing $v_i+\Delta v_m$, $i=-N \ldots N-1$, $m=0 \ldots 7$. A transmission and capture of multi-tone signals for each MTM and the reference multi-tone signal is to happen synchronously to ensure that a reference multi-tone signal is valid.

As indicated above, FIG. 21 is provided as an example. Other examples may differ from what is described with regard to FIG. 21.

In some implementations, an offline relative response measurement algorithm may require two stages, which may be similar to online relative response measurements, although using a multi-tone signal. A first stage may involve measurements per group. Eight groups $n=0 \ldots 7$ may be formed taking transceiver n of each eight-transceiver MTM. The groups may be calibrated separately. For $n=0 \ldots 7$, MTM m ($m=0 \ldots 7$) may connect transceiver n+8m to an offline calibration network. Receiver n+8m may measure simultaneously outputs of transmitters n+8k, $k=0 \ldots 7$, $k \ne m$, which may belong to MTM k and use multi-tone set $v_i+\Delta v_k$, $i=-N \ldots N-1$. Eight multi-tone sets and a reference multi-tone signal may start at the same time.

In some implementations, multi-tone output phasors of the eight receivers n+8m $\alpha_{n+8m}$ and a reference multi-tone $\alpha_{ref}$ may be measured. $\alpha_{n+8m}(v_i+\Delta v_0)$, $i=-N \ldots N-1$, m=1 ... 7 is a result of measuring a signal coming from an n-th transmitter of MTM 0 (through its TRn port) with an n-th receiver of MTM 1 ... 7 (through their TRn port) and may allow to calibrate a relative response of these receivers. $\alpha_{n+8m}(v_i+\Delta v_1)$, i=−N ... N−1, m=0 and 2 may be needed to also calibrate the n-th receiver in MTM 0 by comparing a receiver with another receiver from a previous step (arbitrarily, the n-th receiver of MTM 2). Both receivers may measure an output of an n-th transmitter of MTM 1. $\alpha_n(v_i+\Delta v_m)$, i=−N ... N−1, m=1 ... 7 is a result of measuring signals coming from the n-th transmitter of MTM 1 ... 7 (through their TRn port) with the n-th receiver of MTM 0 (through its TRn port). In this way, a relative response of the n-th transmitter in MTM 1 ... 7 may be calibrated. $\alpha_{n+8}(v_i+\Delta v_0)$, $\alpha_{n+8}(v_i+\Delta v_2)$ may measure signals coming from the n-th transmitter of MTM 0 and MTM 2 using the n-th receiver of MTM 1, which may allow the n-th transmitter in MTM 0 to be calibrated by comparing a transmitter with another transmitter from a previous step (arbitrarily, the n-th transmitter of MTM 2). $\alpha_{ref}(v_i+\Delta v_k)$, i=−N ... N−1, k=0 ... 7 may measure reference multi-tone signals to allow a comparison between frequencies close to $v_i$.

In some implementations, the following ratios may be calculated, which may compare against MTM 2 (this is an arbitrary choice):

Eq. 23

$$\rho_{mn}(v_i) = \begin{cases} \frac{S_{n+16,n}(v_i+\Delta v_0)}{S_{n+8m,n}(v_i+\Delta v_0)} \cdot \frac{\alpha_{n+8m}(v_i+\Delta v_0)}{\alpha_{n+16}(v_i+\Delta v_0)} & m=1...7 \\ \frac{S_{n+16,n+8}(v_i+\Delta v_1)}{S_{n,n+8}(v_i+\Delta v_1)} \cdot \frac{\alpha_n(v_i+\Delta v_1)}{\alpha_{n+16}(v_i+\Delta v_1)} & m=0 \end{cases} \quad i=-N...N-1$$

$$\tau_{mn}(v_i) = \begin{cases} \frac{S_{n,n+16}(v_i+\Delta v_2)}{S_{n,n+8m}(v_i+\Delta v_m)} \cdot \frac{\alpha_n(v_i+\Delta v_m)}{\alpha_n(v_i+\Delta v_2)} \cdot \frac{\alpha_{ref}(v_i+\Delta v_2)}{\alpha_{ref}(v_i+\Delta v_m)} & m=1...7 \\ \frac{S_{n+8,n+16}(v_i+\Delta v_2)}{S_{n+8,n}(v_i+\Delta v_0)} \cdot \frac{\alpha_{n+8}(v_i+\Delta v_0)}{\alpha_{n+8}(v_i+\Delta v_2)} \cdot \frac{\alpha_{ref}(v_i+\Delta v_2)}{\alpha_{ref}(v_i+\Delta v_0)} & m=0 \end{cases} \quad i=-N...N-1$$

Eq. 24 where $\rho_{mn}$ applies to the receivers and $\tau_{mn}$ to the transmitters, respectively, and $S_{ij}$ are the S parameters of the offline calibration network at required frequencies. Further, $\alpha_{ref}$ appears in Eq. 24 because a comparison between different frequencies close to $v_i$ may be required. From Eq. 23 and Eq. 24, $\rho_{2n}(v_i)$ and $\tau_{2n}(v_i)=1$ because MTM 2 is used arbitrarily as reference.

In some implementations, a second stage may involve a comparison between groups. Eight groups may be brought together by comparing one transceiver from each group (e.g., group n is represented by transceiver n of MTM n). MTM n (n=0 ... 7) may connect transceiver 9*n* (e.g., an n-th transceiver of a corresponding eight-transceiver MTM) to the offline calibration network. Receiver 9*n* may measure simultaneously outputs of transmitters 9*k*, k=0 ... 7, k≠n, which may be a k-th transmitter of MTM k and use multi-tone set $v_i+\Delta v_k$, i=−N ... N−1. Eight multi-tone sets and a reference multi-tone signal may start at the same time.

In some implementations, multi-tone output phasors of the eight receivers 9*n* Bon and the reference multi-tone $\beta_{ref}$ may be measured. $\beta_{9n}(v_i+\Delta v_0)$, i=−N ... N−1, n=1 ... 7 is a result of measuring an output of transmitter 0 of MTM 0 (through its TR0) with an n-th receiver of MTM n (n=1 ... 7, through their TRn port). $\beta_0(v_i+\Delta v_1)$, $\beta_{18}(v_i+\Delta v_1)$ is a measurement of an output of transmitter 1 of MTM 1 with receivers 0 and 2 of MTM 0 and MTM 2, respectively, which may be needed to also calibrate receiver 0 of MTM 0 by comparing a receiver with another receiver from a previous step (arbitrarily, receiver 2 of MTM 2). $\beta_0(v_i+\Delta v_k)$, k=1 ... 7 is a result of measuring signals coming from transmitter k of MTM k (through TRk) with receiver 0 of MTM 0 (through TR0). In this way, a relative response of the transmitters in MTM 1 ... 7 may be calibrated. $\beta_9(v_i+\Delta v_0)$, $\beta_9(v_i+\Delta v_2)$ allows to calibrate transmitter 0 of MTM 0 by comparing a transmitter with another transmitter from a previous group (arbitrarily, transmitter 2 of MTM 2). $\beta_{ref}(v_i+\Delta v_k)$, i=−N ... N−1, k=0 ... 7 measures a reference multi-tone signal to allow a comparison between frequencies close to $v_i$. Further, the second stage may involve stopping a multi-tone transmission, terminating TR ports on the offline calibration network, and taking reference values of the online calibration $T_{mn,ref}$ and $R_{mn,ref}$.

In some implementations, the following ratios may be calculated, which may compare group n against group 2 (this is an arbitrary choice):

Eq. 25

$$g\rho_n(v_i) = \begin{cases} \frac{S_{18,0}(v_i+\Delta v_0)}{S_{9n,0}(v_i+\Delta v_0)} \cdot \frac{\beta_{9n}(v_i+\Delta v_0)}{\beta_{18}(v_i+\Delta v_0)} & n=1...7 \\ \frac{S_{18,9}(v_i+\Delta v_1)}{S_{0,9}(v_i+\Delta v_1)} \cdot \frac{\beta_0(v_i+\Delta v_1)}{\beta_{18}(v_i+\Delta v_1)} & n=0 \end{cases} \quad i=-N...N-1$$

$$g\tau_n(v_i) = \begin{cases} \frac{S_{0,18}(v_i+\Delta v_2)}{S_{0,9n}(v_i+\Delta v_n)} \cdot \frac{\beta_0(v_i+\Delta v_n)}{\beta_0(v_i+\Delta v_2)} \cdot \frac{\beta_{ref}(v_i+\Delta v_2)}{\beta_{ref}(v_i+\Delta v_n)} & n=1...7 \\ \frac{S_{9,18}(v_i+\Delta v_2)}{S_{9,0}(v_i+\Delta v_n)} \cdot \frac{\beta_9(v_i+\Delta v_0)}{\beta_9(v_i+\Delta v_2)} \cdot \frac{\beta_{ref}(v_i+\Delta v_2)}{\beta_{ref}(v_i+\Delta v_0)} & n=0 \end{cases} \quad i=-N...N-1$$

Eq. 26 where $g\rho_n$ applies to the receivers and gun to the transmitters, respectively, with $g\rho_2=g\tau_2=1$, and $S_{ij}$ are the S parameters of the offline calibration network at the required frequencies.

In some implementation, by using the two sets of ratios, the following may be defined for the receivers and the transmitters, respectively:

$$R_{mn}(v_i) = \frac{\rho_{mn}(v_i)}{\rho_{nn}(v_i)} \cdot g\rho_n(v_i) \qquad \text{Eq. 27}$$

$$T_{mn}(v_i) = \frac{\tau_{mn}(v_i)}{\tau_{nn}(v_i)} \cdot g\tau_n(v_i) \qquad \text{Eq. 28}$$

where the factors $1/\rho_{nn}(v_i)$ and $1/\tau_{nn}(v_i)$ may allow transceiver n of MTM n to represent itself. In the first stage, transceiver n of MTM m may be compared with transceiver n of MTM 2). Further, $R_{22}(v_i)=T_{22}(v_i)=1$.

In some implementations, a Wye splitter may be used as an offline calibration network. The offline calibration network may include an eight-port Wye splitter connected to SP8T switches to offer 64 RF ports. In some cases, a simple eight-port Wye splitter may be used. Offline calibration equations may remain the same in this case, except for S parameter terms, because the Wye splitter has eight instead of 64 ports. Various S parameters may be used with the 8-port calibration network, which may be derived by observing that each port of the 8-port calibration network is used for a specific MTM. Such S parameters may be required with 64 (switched) and 8-port (Wye splitter) offline calibration networks.

In some implementations, a calculation of equalizer coefficients may involve a calculation of $h_{mn}^{TX}[s]$ and $h_{mn}^{RX}[s]$, where $h_{mn}^{TX}[s]$ and $h_{mn}^{RX}[s]$ may be obtained from $T_{mn}[i]$ and $R_{mn}[i]$ using a Moore-Penrose pseudoinverse matrix pA as follows:

$$R_{mn}[i]=R_{mn}(v_i) \qquad \text{Eq. 29}$$

$$T_{mn}[i]=T_{mn}(v_i) \qquad \text{Eq. 30}$$

$$h_{mn}^{RX}[s] = \sum_{i=-N}^{N-1} pA[s, i]/R_{mn}[i]\, s = 0 \ldots M \qquad \text{Eq. 31}$$

$$h_{mn}^{TX}[s] = \sum_{i=-N}^{N-1} pA[s, i]/T_{mn}[i]\, s = 0 \ldots M \qquad \text{Eq. 32}$$

where M is an order of a filter, and pA[s,i] (s=0 . . . M, i=−N . . . N−1) is an element in an intersection of the n-th row and the i-th column of the pA matrix.

In some implementations, for a calculation of the pseudoinverse matrix pA used to obtain impulse responses of the equalizers in Eq. 31 and Eq. 32, calculation may happen offline and read from a file or configuration store during adjustment, which may be possible because the pA matrix is the same for all MTMs as long as the filter order M, measured frequencies $v_i$ and sampling frequency $F_S$ do not change. Discrete time angular frequencies $\Omega_i$ may be calculated from $v_i$ in accordance with:

$$\Omega_i = \frac{2\pi v_i}{F_s} \qquad \text{Eq. 33}$$

$$i = -N \ldots N-1$$

and the matrix A may be obtained as:

$$A_{il}=e^{-j \cdot l \cdot \Omega_i} \qquad \text{Eq. 34}$$

where i=−N . . . N−1 and l=0 . . . M. Further, pA is the Moore-Penrose pseudoinverse of A.

Figure 22:
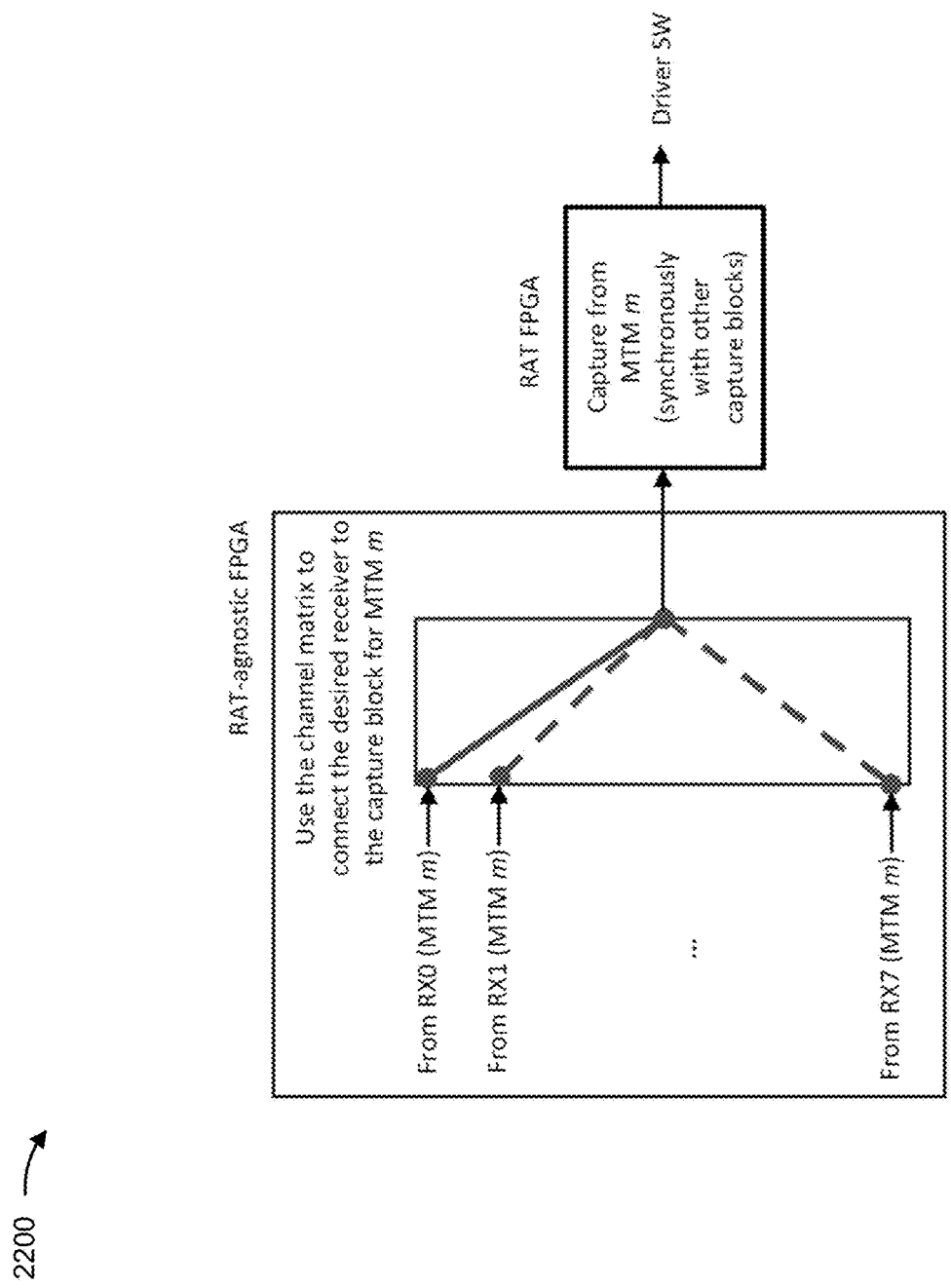
FIG. 22 is a diagram of an example associated with a capture block.

FIG. 22 is a diagram of an example 2200 associated with a capture block. As shown in FIG. 22, a channel matrix in the digital signal processing and computing block may allow to connect a desired receiver or transmitter to a capture block associated to each MTM. As indicated above, FIG. 22 is provided as an example. Other examples may differ from what is described with regard to FIG. 22.

Figure 23:
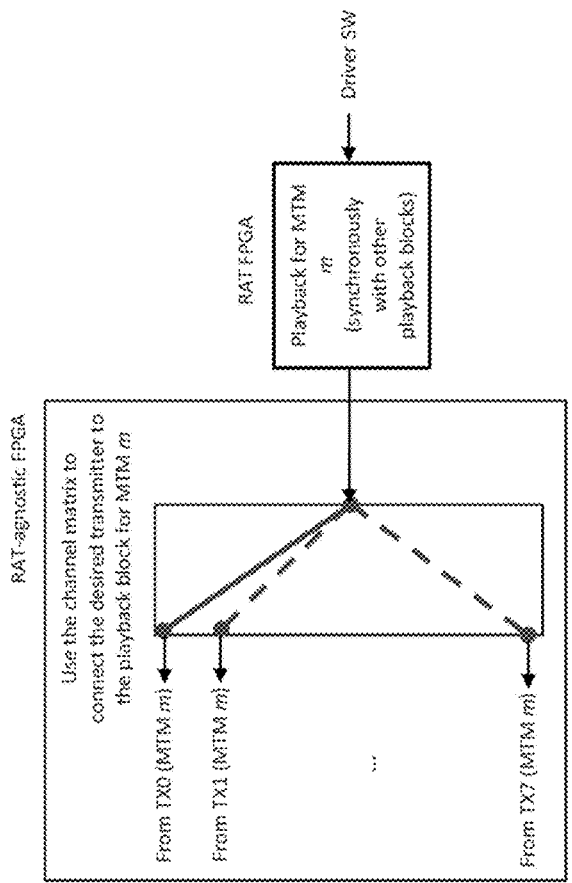
FIG. 23 is a diagram of an example associated with a playback block.

FIG. 23 is a diagram of an example 2300 associated with a playback block. As shown in FIG. 23, a channel matrix in the digital signal processing and computing block may allow to connect a desired receiver or transmitter to a playback block associated to each MTM. As indicated above, FIG. 23 is provided as an example. Other examples may differ from what is described with regard to FIG. 23.

Figure 24:
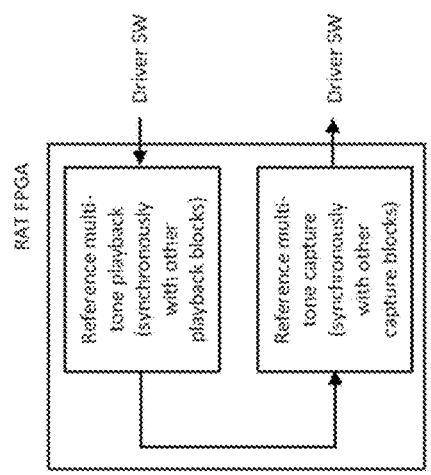
FIG. 24 is a diagram of an example associated with a reference multi-tone digital loopback.

FIG. 24 is a diagram of an example 2400 associated with a reference multi-tone digital loopback. As shown in FIG. 24, as part of the reference multi-tone digital loopback, a reference multi-tone signal may be measured within the digital signal processing and computing block. As indicated above, FIG. 24 is provided as an example. Other examples may differ from what is described with regard to FIG. 24.

In an equalizer topology, a relative frequency response may be asymmetric with respect to the center frequency, which means that the equalizer topology may be a complex filter, where:

$$h_{mn}^{RX}[s]=h_{mn,re}^{RX}[s]+j \cdot h_{mn,im}^{RX}[s] \qquad \text{Eq. 35}$$

$$h_{mn}^{TX}[s]=h_{mn,re}^{TX}[s]+j \cdot h_{mn,im}^{TX}[s] \qquad \text{Eq. 36}$$

are impulse responses of the receiver and transmitter equalizers, respectively. Therefore, for example, a $7^{th}$ order equalizer may include four $7^{th}$ order real filters.

Figure 25:
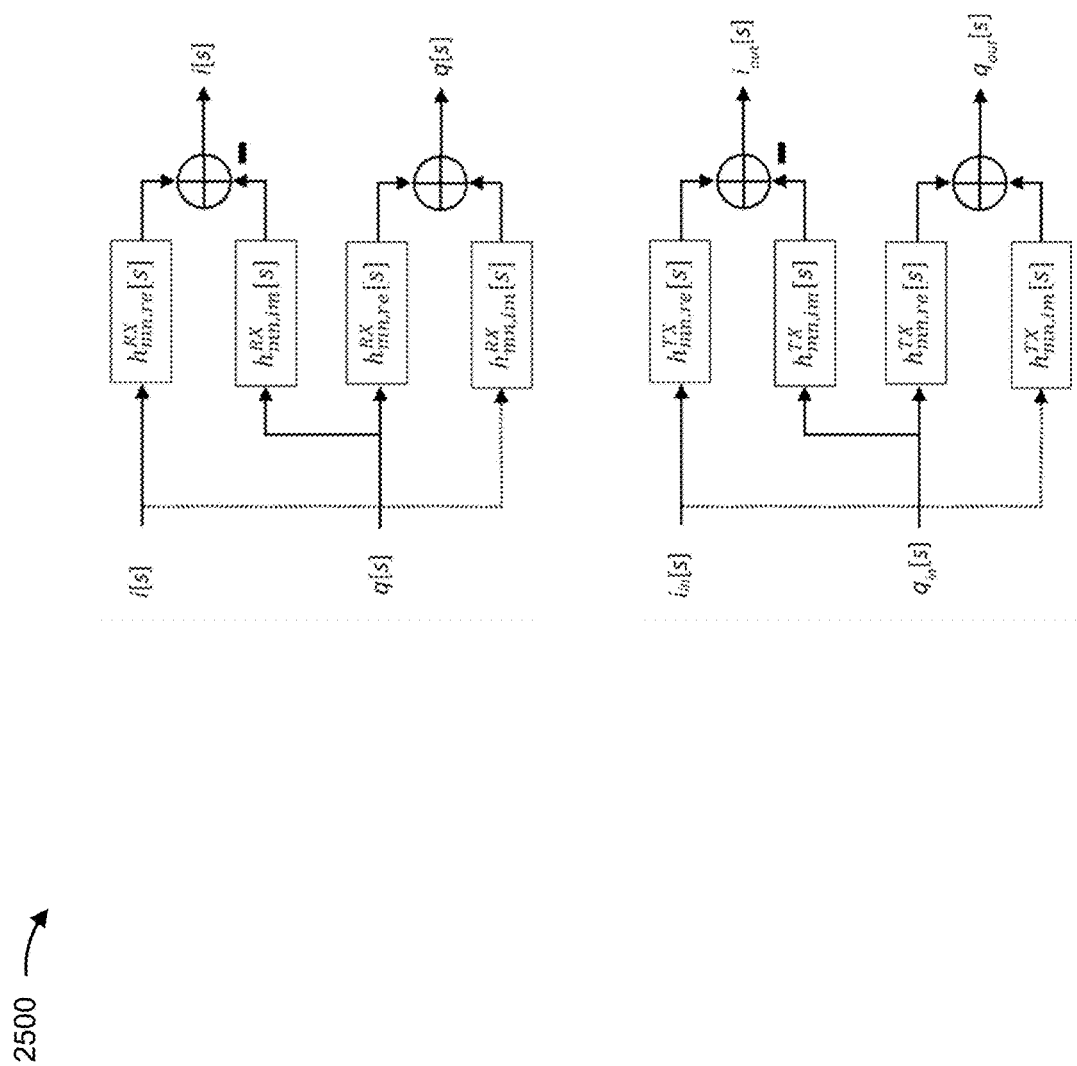
FIG. 25 is a diagram of an example associated with a complex filter.

FIG. 25 is a diagram of an example 2500 associated with a complex filter. As shown in FIG. 25, a complex filter structure may be used to equalize relative frequency response for receivers and transmitters. As indicated above, FIG. 25 is provided as an example. Other examples may differ from what is described with regard to FIG. 25.

In some implementations, resource optimization by overclocking may be employed. Overclocking may allow to multiplex resources, therefore improving a utilization of digital signal processor (DSP) resources. For example, in some implementations FPGA DSP cells may be multiplexed to design multi-channel FIR filters.

Figure 26:
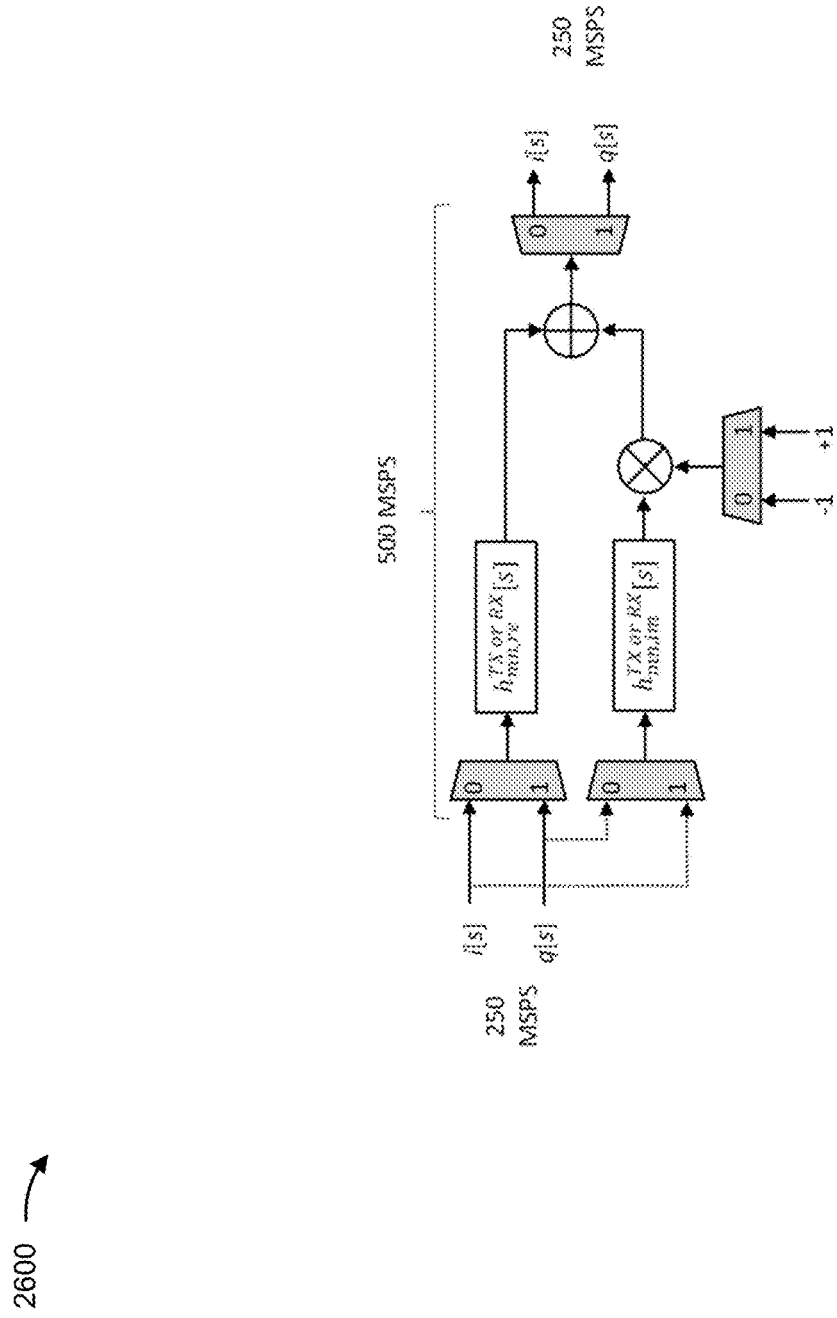
FIG. 26 is a diagram of an example associated with a multiplexed equalizer.

FIG. 26 is a diagram of an example 2600 associated with a multiplexed equalizer.

As shown in FIG. 26, resource optimization by overclocking may be applied to a 200 MHz bandwidth (250 MSPS) scenario. Two real filters able to operate at 500 MSPS may be multiplexed, and an output of $h_{mn,im}^{TX\ or\ RX}[s]$ may be inverted to calculate $i_{out}[s]$.

As indicated above, FIG. 26 is provided as an example. Other examples may differ from what is described with regard to FIG. 26.

Figure 27:
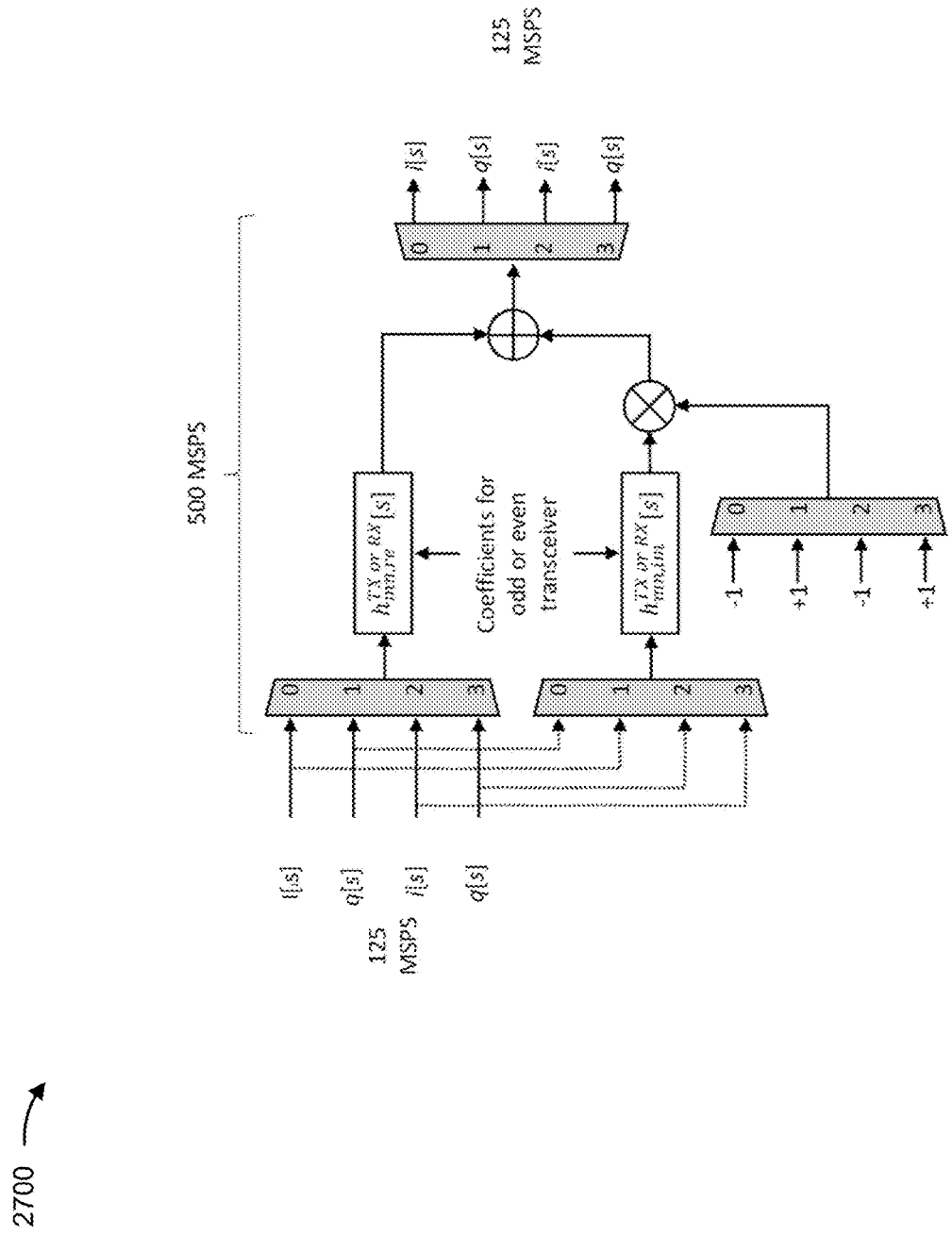
FIG. 27 is a diagram of an example associated with a multiplexed equalizer.

FIG. 27 is a diagram of an example 2700 associated with a multiplexed equalizer.

As shown in FIG. 27, resource optimization by overclocking may be applied to a 100 MHz bandwidth (125 MSPS) case. Two transceivers may share a pair of filters that run at 500 MSPS. Since each transceiver has a different equalizer response, filter coefficients may be reprogrammed continuously every two clock cycles.

As indicated above, FIG. 27 is provided as an example. Other examples may differ from what is described with regard to FIG. 27.

In some implementations, amplitude and phase corrections may be absorbed by the equalizers. The amplitude and phase corrections calculated by an online calibration algorithm may be absorbed into coefficients of the equalizers, removing the need for dedicated amplitude and phase correction blocks. Given gain and phase correction values $G_{mn}^{TX}$ and $\theta_{mn}^{TX}$, for the transmitters, and $G_{mn}^{RX}$ and $\theta_{mn}^{RX}$ for the receivers, respectively, the online calibration algorithm may adjust equalizer coefficients $h_{mn,offline}^{RX}[s]$ and $h_{mn,offline}^{TX}[s]$ given by the offline calibration (Eq. 31 and Eq. 32) as follows:

$$h_{mn,online}^{RX}[s] = G_{RX} \cdot e^{j\theta_{RX}} \cdot h_{mn,offline}^{RX}[s] s = 0 \ldots M \quad \text{Eq. 37}$$

$$h_{mn,online}^{TX}[s] = G_{TX} \cdot e^{j\theta_{TX}} \cdot h_{mn,offline}^{TX}[s] s = 0 \ldots M \quad \text{Eq. 38}$$

Figure 28:
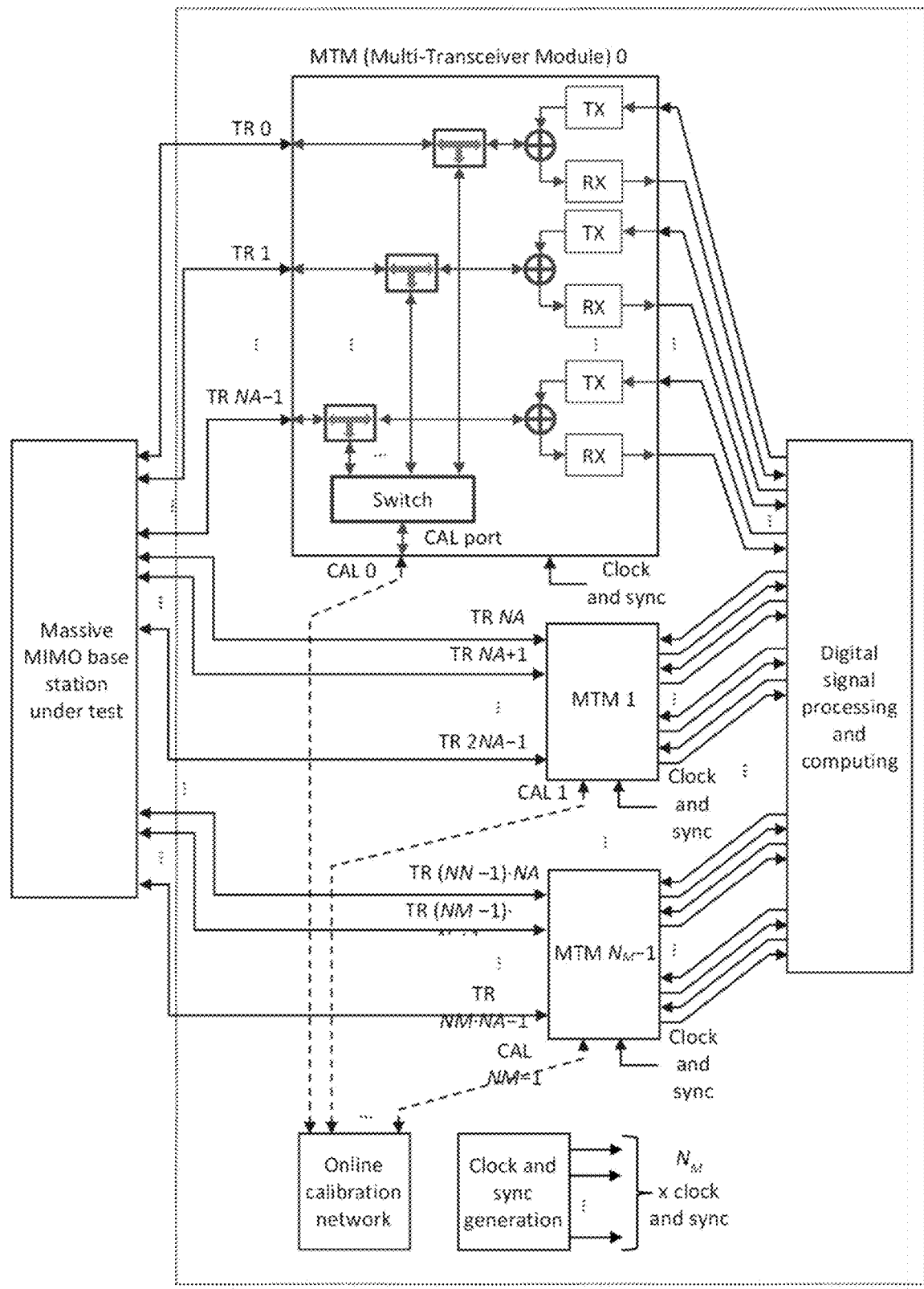
FIG. 28 is a diagram of an example associated with a massive MIMO base station test system.

FIG. 28 is a diagram of an example 2800 associated with a massive MIMO base station test system.

As shown in FIG. 28, a network test device (e.g., a massive MIMO base station test system) may be used to test a massive MIMO base station. The network test device may include a transceiver array, where the transceiver array may include a plurality of multi-transceiver modules (MTM). Each MTM may comprise several transceivers. Each transceiver may include a transmitter and a receiver, which may be used for calibration of amplitude and phase errors of the transceiver array. Calibration signals associated with the transceiver array may be processed using a digital signal processing and computing block. The network test device may include an online calibration network as well as clock and synchronization generation, which may be used to achieve the calibration of the amplitude and phase errors.

As indicated above, FIG. 28 is provided as an example. Other examples may differ from what is described with regard to FIG. 28.

Figure 29:
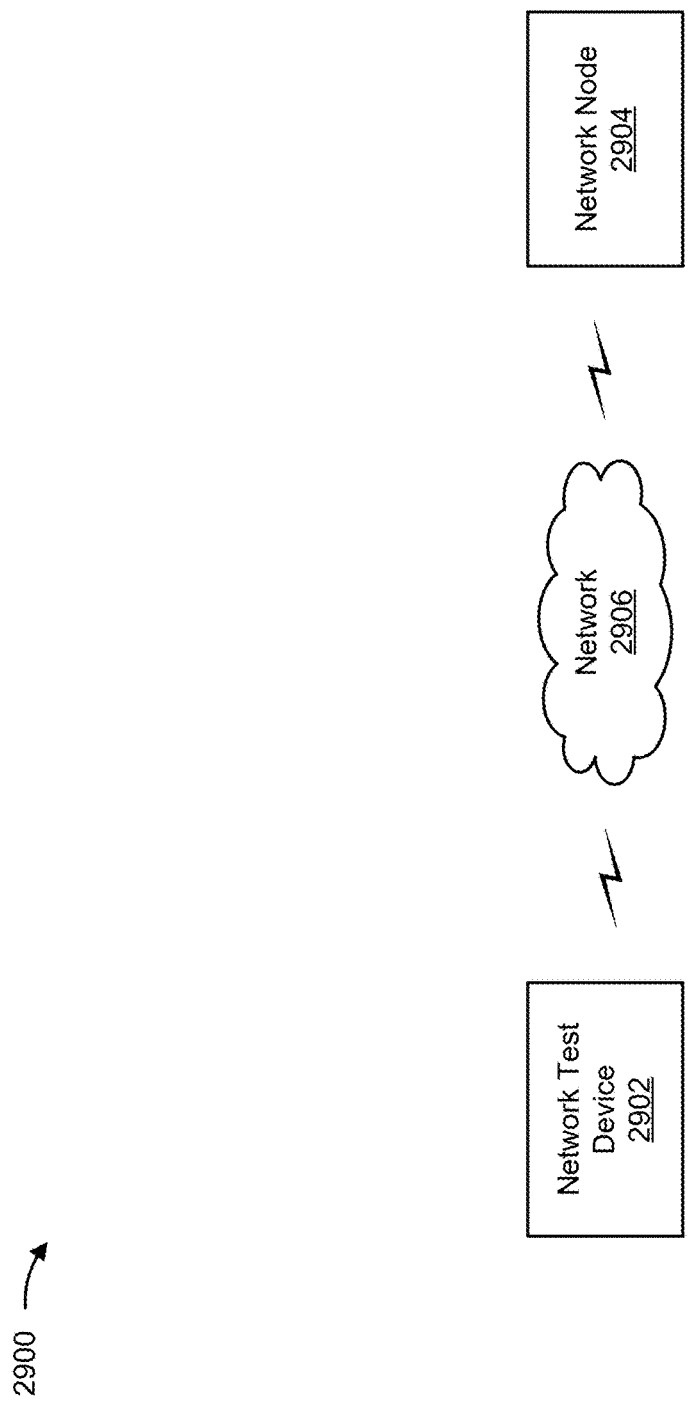
FIG. 29 is a diagram of an example environment in which systems and/or methods described herein may be implemented.

FIG. 29 is a diagram of an example environment 2900 in which systems and/or methods described herein may be implemented. As shown in FIG. 29, environment 2900 may include a network test device 2902, a network node 2904, and a network 2906. Devices of environment 2900 may interconnect via wired connections, wireless connections, or a combination of wired and wireless connections.

The network test device 2902 may include one or more devices capable of receiving, processing, storing, routing, and/or providing information associated with calibrating amplitude and phase of a transceiver array in a network test device, as described elsewhere herein. The network test device 2902 may include a computing device. The network test device 2902 may be used by network equipment manufacturers for function, system integration, capacity, and stress testing and emulation of a plurality of mobile devices, across multiple cells, to set up and test network nodes. The network test device 2902 may deliver voice, data, realistic mobility models, and 4G/5G core emulation, thereby providing a comprehensive validation solution. The network test device 2902 may ensure that users in a network are obtaining adequate quality of service. The network test device 2902 may ensure that the network is satisfying latency and round-trip time requirements for voice and time-critical applications.

The network node 2904 may include one or more devices capable of receiving, processing, storing, routing, and/or providing information associated with calibrating amplitude and phase of a transceiver array in a network test device, as described elsewhere herein. The network node 2904 may be an aggregated network node, meaning that the aggregated network node is configured to utilize a radio protocol stack that is physically or logically integrated within a single RAN node (e.g., within a single device or unit). The network node 2904 may be a disaggregated network node (sometimes referred to as a disaggregated base station), meaning that the network node 2904 is configured to utilize a protocol stack that is physically or logically distributed among two or more nodes (such as one or more central units (CUs), one or more distributed units (DUs), or one or more radio units (RUs)). The network node 2904 may include, for example, a New Radio (NR) base station, a long-term evolution (LTE) base station, a Node B, an eNB (e.g., in 4G), a gNB (e.g., in 4G), an access point, a transmission reception point (TRP), a DU, an RU, a CU, a mobility element of a network, a core network node, a network element, a network equipment, and/or a radio access network (RAN) node.

The network 2906 may include one or more wired and/or wireless networks. For example, the network 2906 may include a cellular network (e.g., a 5G network, a 4G network, an LTE network, a Third Generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 2906 may enable communication among the one or more devices of environment 2900.

The number and arrangement of devices and networks shown in FIG. 29 are provided as an example. In practice, there may be additional devices and/or networks, fewer devices and/or networks, different devices and/or networks, or differently arranged devices and/or networks than those shown in FIG. 29. Furthermore, two or more devices shown in FIG. 29 may be implemented within a single device, or a single device shown in FIG. 29 may be implemented as multiple, distributed devices. Additionally, or alternatively, a set of devices (e.g., one or more devices) of environment 2900 may perform one or more functions described as being performed by another set of devices of environment 2900.

Figure 30:
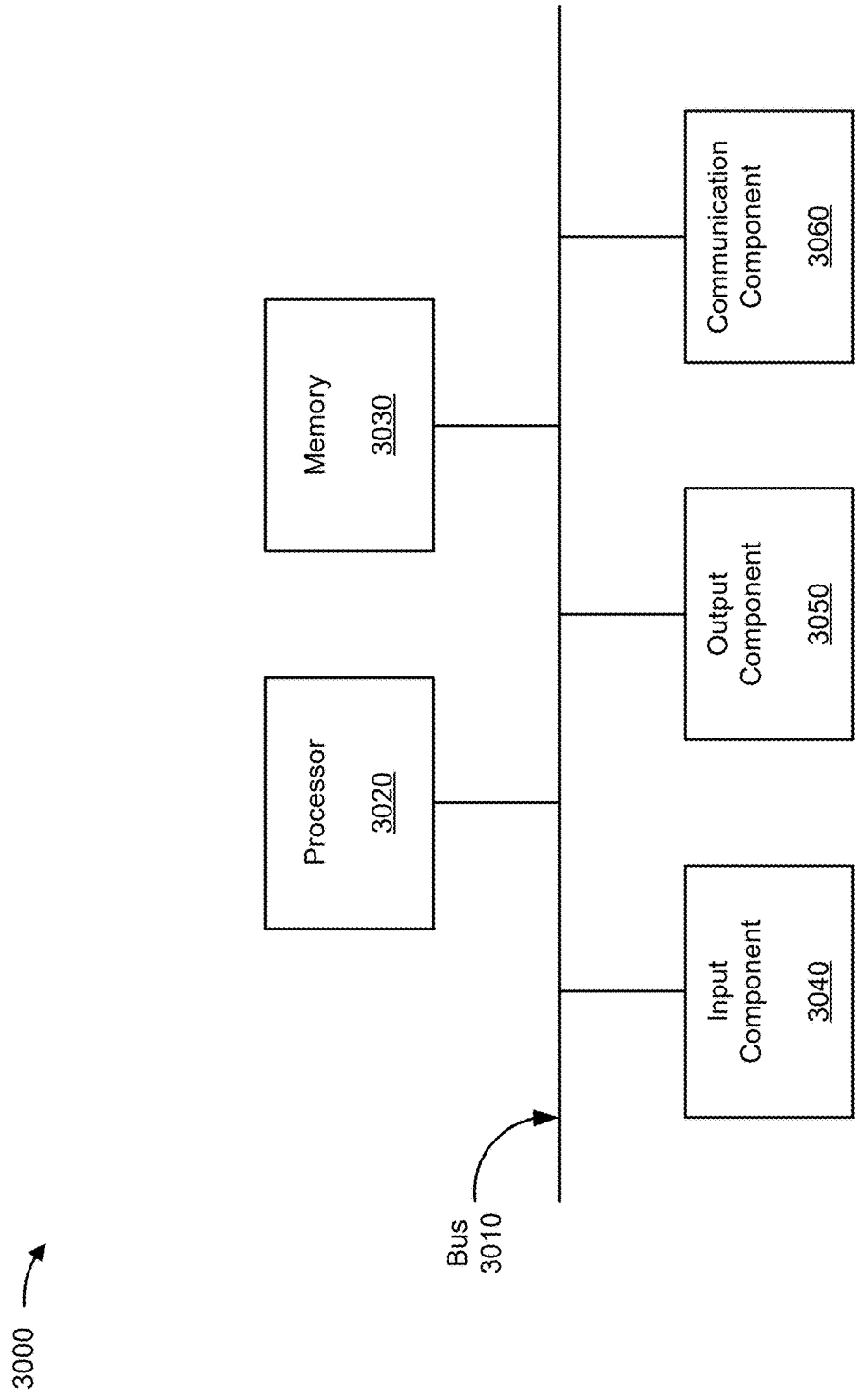
FIG. 30 is a diagram of example components of one or more devices of FIG. 29.

FIG. 30 is a diagram of example components of a device 3000 associated with calibrating amplitude and phase of a transceiver array in a network test device. The device 3000 may correspond to a network test device (e.g., network test device 2902). In some implementations, the device may include one or more devices 3000 and/or one or more components of the device 3000. As shown in FIG. 30, the device 3000 may include a bus 3010, a processor 3020, a memory 3030, an input component 3040, an output component 3050, and/or a communication component 3060.

The bus 3010 may include one or more components that enable wired and/or wireless communication among the components of the device 3000. The bus 3010 may couple together two or more components of FIG. 30, such as via operative coupling, communicative coupling, electronic coupling, and/or electric coupling. For example, the bus 3010 may include an electrical connection (e.g., a wire, a trace, and/or a lead) and/or a wireless bus. The processor 3020 may include a central processing unit, a graphics processing unit, a microprocessor, a controller, a microcontroller, a digital signal processor, a field-programmable gate array, an application-specific integrated circuit, and/or another type of processing component. The processor 3020 may be implemented in hardware, firmware, or a combination of hardware and software. In some implementations, the processor 3020 may include one or more processors capable of being programmed to perform one or more operations or processes described elsewhere herein.

The memory 3030 may include volatile and/or nonvolatile memory. For example, the memory 3030 may include random access memory (RAM), read only memory (ROM), a hard disk drive, and/or another type of memory (e.g., a flash memory, a magnetic memory, and/or an optical memory). The memory 3030 may include internal memory (e.g., RAM, ROM, or a hard disk drive) and/or removable memory (e.g., removable via a universal serial bus connection). The memory 3030 may be a non-transitory computer-readable medium. The memory 3030 may store information, one or more instructions, and/or software (e.g., one or more software applications) related to the operation of the device 3000. In some implementations, the memory 3030 may include one or more memories that are coupled (e.g., communicatively coupled) to one or more processors (e.g., processor 3020), such as via the bus 3010. Communicative coupling between a processor 3020 and a memory 3030 may enable the processor 3020 to read and/or process information stored in the memory 3030 and/or to store information in the memory 3030.

The input component 3040 may enable the device 3000 to receive input, such as user input and/or sensed input. For example, the input component 3040 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 3050 may enable the device 3000 to provide output, such as via a display, a speaker, and/or a light-emitting diode. The communication component 3060 may enable the device 3000 to communicate with other devices via a wired connection and/or a wireless connection. For example, the communication component 3060 may include a receiver, a transmitter, a transceiver, a modem, a network interface card, and/or an antenna.

The device 3000 may perform one or more operations or processes described herein. For example, a non-transitory computer-readable medium (e.g., memory 3030) may store a set of instructions (e.g., one or more instructions or code) for execution by the processor 3020. The processor 3020 may execute the set of instructions to perform one or more operations or processes described herein. In some implementations, execution of the set of instructions, by one or more processors 3020, causes the one or more processors 3020 and/or the device 3000 to perform one or more operations or processes described herein. In some implementations, hardwired circuitry may be used instead of or in combination with the instructions to perform one or more operations or processes described herein. Additionally, or alternatively, the processor 3020 may be configured to perform one or more operations or processes described herein. Thus, implementations described herein are not limited to any specific combination of hardware circuitry and software.

The number and arrangement of components shown in FIG. 30 are provided as an example. The device 3000 may include additional components, fewer components, different components, or differently arranged components than those shown in FIG. 30. Additionally, or alternatively, a set of components (e.g., one or more components) of the device 3000 may perform one or more functions described as being performed by another set of components of the device 3000.

Figure 31:
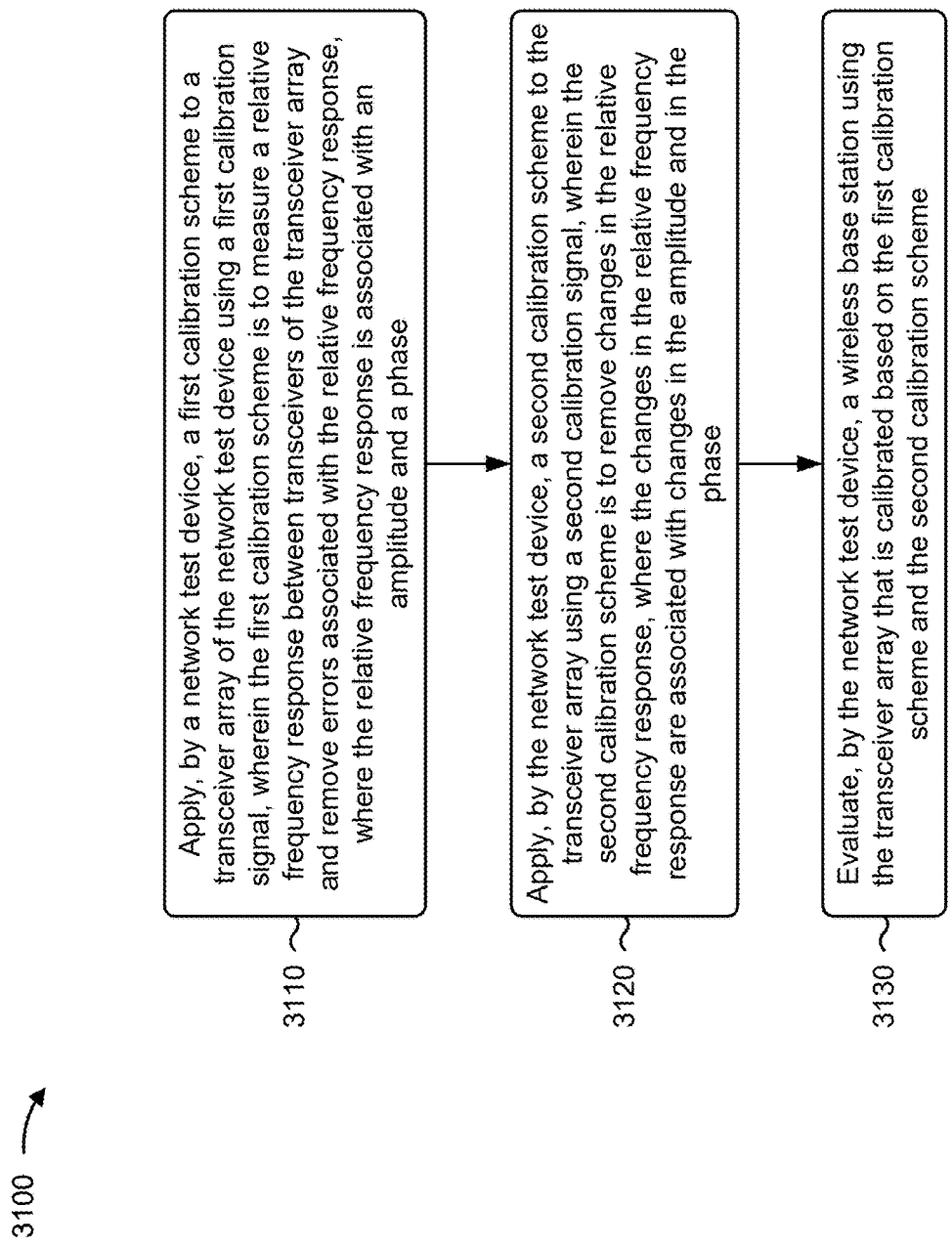
FIG. 31 is a flowchart of an example process relating to calibrating amplitude and phase of a transceiver array in a network test device.

FIG. 31 is a flowchart of an example process 3100 associated with calibrating amplitude and phase of a transceiver array in a network test device. In some implementations, one or more process blocks of FIG. 31 may be performed by a network test device (e.g., network test device 2902). Additionally, or alternatively, one or more process blocks of FIG. 31 may be performed by one or more components of device 3000, such as processor 3020, memory 3030, input component 3040, output component 3050, and/or communication component 3060.

As shown in FIG. 31, process 3100 may include applying, by the network test device, a first calibration scheme to a transceiver array of the network test device using a first calibration signal, wherein the first calibration scheme is to measure a relative frequency response between transceivers of the transceiver array and remove errors associated with the relative frequency response, where the relative frequency response is associated with an amplitude and a phase (block 3110).

As shown in FIG. 31, process 3100 may include applying, by the network test device, a second calibration scheme to the transceiver array using a second calibration signal, wherein the second calibration scheme is to remove changes in the relative frequency response during normal operation, where the changes in the relative frequency response are associated with changes in the amplitude and in the phase (block 3120).

As shown in FIG. 31, process 3100 may include evaluating, by the network test device, a wireless base station using the transceiver array that is calibrated based on the first calibration scheme and the second calibration scheme (block 3130).

In some implementations, the first calibration scheme is an offline calibration scheme that occurs at a factory or at a customer site, and the first calibration scheme is to compensate for the response of the transceiver array of the network test device, as well as an effect of cables and attenuators of the network test device. In some implementations, the second calibration scheme is an online calibration scheme that runs continuously during a normal operation of the network test device, and the second calibration scheme is to measure the changes in the relative frequency response caused by one or more of a phase drift of a local oscillator, temperature, or aging.

In some implementations, the first calibration signal is a multi-tone signal that characterizes frequency-dependent amplitude and phase errors associated with the transceiver array. In some implementations, the second calibration signal is a low-level, out-of-band signal that does not affect a normal operation of the network test device.

In some implementations, the first calibration scheme involves a usage of external Wye splitter and one or more switches to allow for calibration of the transceiver array, wherein one or more receivers of the transceiver array measure a common transmitter of the transceiver array, wherein one or more transmitters of the transceiver array are measured with a common receiver of the transceiver array, and wherein the calibration of the transceiver array is based on a comparison between measurements.

In some implementations, the second calibration scheme includes a usage of one or more couplers, one or more switches, and an internal Wye splitter to allow for calibration of the transceiver array. In some implementations, one or more transceivers of the transceiver array include the one or more couplers and the one or more switches to allow the second calibration signal to be routed to other transceivers of the transceiver array through the internal Wye splitter, wherein one or more receivers of the transceiver array measure a common transmitter of the transceiver array, wherein the one or more transmitters are measured with a common receiver of the transceiver array, and wherein the calibration of the transceiver array is based on a comparison between measurements.

In some implementations, the first calibration scheme and the second calibration scheme are implemented to obtain a required amplitude and phase accuracy for the transceiver array. In some implementations, the base station is a massive MIMO base station.

Although FIG. 31 shows example blocks of process 3100, in some implementations, process 3100 may include additional blocks, fewer blocks, different blocks, or differently arranged blocks than those depicted in FIG. 31. Additionally, or alternatively, two or more of the blocks of process 3100 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z." No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
applying, by a network test device, a first calibration scheme to a transceiver array of the network test device using a first calibration signal, wherein the first calibration scheme is to measure a relative frequency response between transceivers of the transceiver array and remove errors associated with the relative frequency response, where the relative frequency response is associated with an amplitude and a phase;
applying, by the network test device, a second calibration scheme to the transceiver array using a second calibration signal, wherein the second calibration scheme is to remove changes in the relative frequency response, where the changes in the relative frequency response are associated with changes in the amplitude and in the phase; and
evaluating, by the network test device, a wireless base station using the transceiver array that is calibrated based on the first calibration scheme and the second calibration scheme.

2. The method of claim 1, wherein the first calibration scheme is an offline calibration scheme, and the first calibration scheme is to compensate for an amplitude and phase response of the transceiver array of the network test device, as well as an effect of cables and attenuators of the network test device.

3. The method of claim 1, wherein the second calibration scheme is an online calibration scheme that runs continuously during a normal operation of the network test device, and the second calibration scheme is to measure the changes in the relative frequency response caused by one or more of a phase drift of a local oscillator, temperature, or aging.

4. The method of claim 1, wherein the first calibration signal is a multi-tone signal that characterizes frequency-dependent amplitude and phase errors associated with the transceiver array.

5. The method of claim 1, wherein the second calibration signal is a low-level, out-of-band signal that does not affect a normal operation of the network test device.

6. The method of claim 1, wherein the first calibration scheme involves a usage of a Wye splitter and one or more switches to allow for calibration of the transceiver array, wherein one or more receivers of the transceiver array measure a common transmitter of the transceiver array, wherein one or more transmitters of the transceiver array are measured with a common receiver of the transceiver array, and wherein the calibration of the transceiver array is based on a comparison between measurements.

7. The method of claim 1, wherein the second calibration scheme includes a usage of one or more couplers, one or more switches, and an internal Wye splitter to allow for calibration of the transceiver array.

8. The method of claim 7, wherein one or more transceivers of the transceiver array includes the one or more couplers and the one or more switches to allow the second calibration signal to be routed to other transceivers of the transceiver array through the internal Wye splitter, wherein one or more receivers of the transceiver array measure a common transmitter of the transceiver array, wherein the one or more transmitters are measured with a common receiver of the transceiver array, and wherein the calibration of the transceiver array is based on a comparison between measurements.

9. The method of claim 1, wherein the first calibration scheme and the second calibration scheme are implemented to obtain a required amplitude and phase accuracy for the transceiver array.

10. The method of claim 1, wherein the base station is a massive multiple-input multiple-output (MIMO) base station.

11. A network test device, comprising:
one or more components configured to:
apply a first calibration scheme to a transceiver array of the network test device using a first calibration signal, wherein the first calibration scheme is to measure a relative frequency response between transceivers of the transceiver array and remove errors associated with the relative frequency response, where the relative frequency response is associated with an amplitude and a phase;
apply a second calibration scheme to the transceiver array using a second calibration signal, wherein the second calibration scheme is to remove changes in the relative frequency response, where the changes in the relative frequency response are associated with changes in the amplitude and in the phase; and
evaluate a massive multiple-input multiple-output (MIMO) wireless base station using the transceiver array that is calibrated based on the first calibration scheme and the second calibration scheme.

12. The network test device of claim 11, wherein the first calibration scheme is an offline calibration scheme, and the first calibration scheme is to compensate for an amplitude and phase response of the transceiver array of the network test device, as well as an effect of cables and attenuators of the network test device.

13. The network test device of claim 11, wherein the second calibration scheme is an online calibration scheme that runs continuously during a normal operation of the network test device, and the second calibration scheme is to measure the changes in the relative frequency response caused by one or more of a phase drift of a local oscillator, temperature, or aging.

14. The network test device of claim 11, wherein the first calibration signal is a multi-tone signal that characterizes frequency-dependent amplitude and phase errors associated with the transceiver array.

15. The network test device of claim 11, wherein the second calibration signal is a low-level, out-of-band signal that does not affect a normal operation of the network test device.

16. The network test device of claim 11, wherein the first calibration scheme involves a usage of an external Wye splitter and one or more switches to allow for calibration of the transceiver array, wherein one or more receivers of the transceiver array measure a common transmitter of the transceiver array, wherein one or more transmitters of the transceiver array are measured with a common receiver of the transceiver array, and wherein the calibration of the transceiver array is based on a comparison between measurements.

17. The network test device of claim 11, wherein the second calibration scheme includes a usage of one or more couplers, one or more switches, and an internal Wye splitter to allow for calibration of the transceiver array.

18. The network test device of claim 17, wherein one or more transceivers of the transceiver array includes the one or more couplers and the one or more switches to allow the second calibration signal to be routed to other transceivers of the transceiver array through the internal Wye splitter, wherein one or more receivers of the transceiver array measure a common transmitter of the transceiver array, wherein the one or more transmitters are measured with a common receiver of the transceiver array, and wherein the calibration of the transceiver array is based on a comparison between measurements.

19. The network test device of claim 11, wherein the first calibration scheme and the second calibration scheme are implemented to obtain a required amplitude and phase accuracy for the transceiver array.

20. A non-transitory computer-readable medium storing a set of instructions, the set of instructions comprising:
one or more instructions that, when executed by one or more processors of a network test device, cause the network test device to:
apply a first calibration scheme to a transceiver array of the network test device using a first calibration signal, wherein the first calibration scheme is to measure a relative frequency response between transceivers of the transceiver array and remove errors associated with the relative frequency response, where the relative frequency response is associated with an amplitude and a phase;
apply a second calibration scheme to the transceiver array using a second calibration signal, wherein the second calibration scheme is to remove changes in the relative frequency response, where the changes in the relative frequency response are associated with changes in the amplitude and in the phase; and
evaluate a massive multiple-input multiple-output (MIMO) wireless base station using the transceiver array that is calibrated based on the first calibration scheme and the second calibration scheme.

* * * * *